Figure 1:
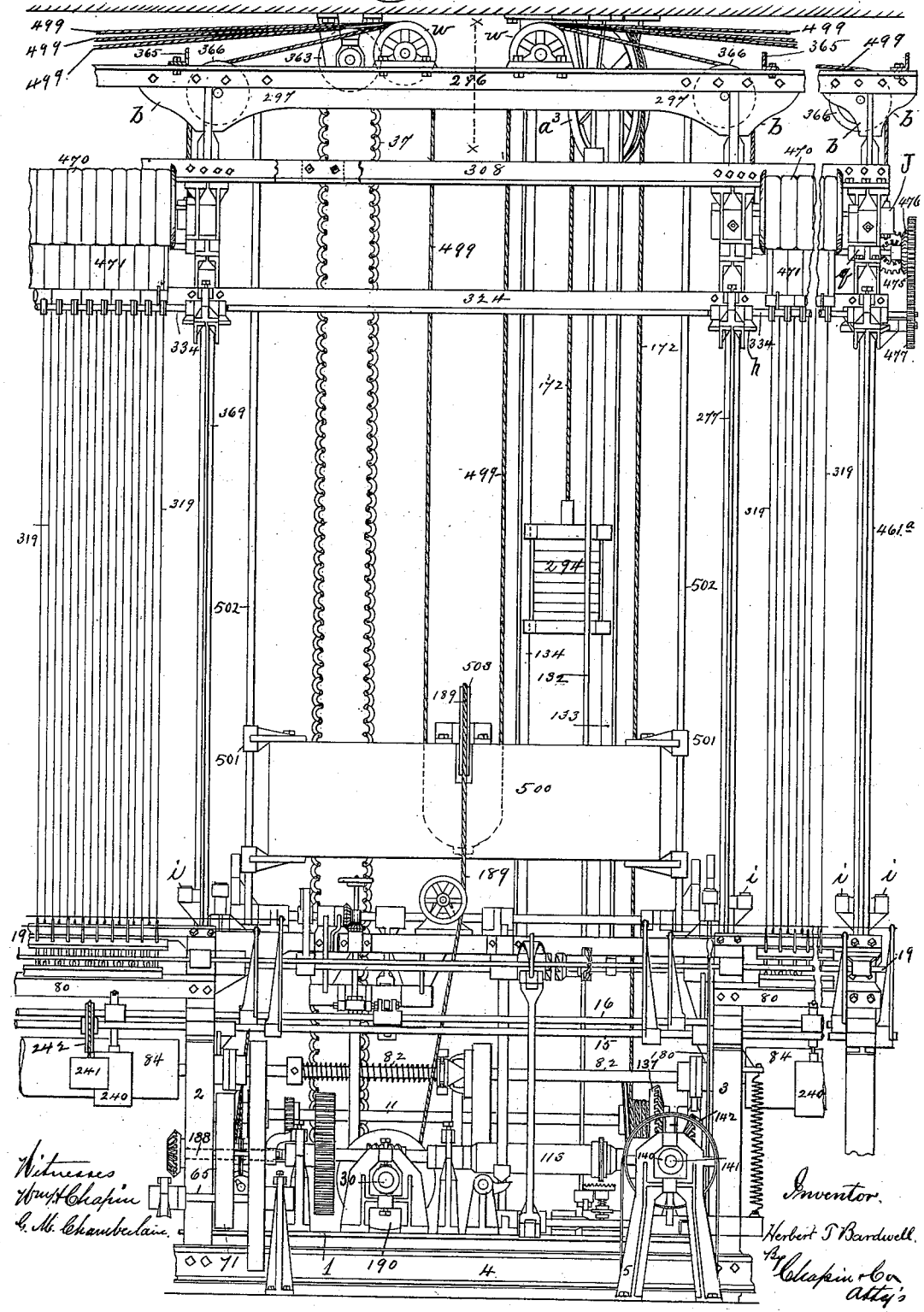

(No Model.) 19 Sheets—Sheet 1.

H. T. BARDWELL.
VERTICAL SPINNING MULE.

No. 384,496. Patented June 12, 1888.

Witnesses
Wm. H. Chapin
G. M. Chamberlain

Inventor.
Herbert T. Bardwell
By Chapin & Co
Atty's (No Model.) 19 Sheets—Sheet 3.
H. T. BARDWELL.
VERTICAL SPINNING MULE.

No. 384,496. Patented June 12, 1888.

(No Model.)  H. T. BARDWELL.  19 Sheets—Sheet 4.
VERTICAL SPINNING MULE.
No. 384,496.  Patented June 12, 1888.

Witnesses
Wm H Chapin
G. M. Chamberlain

Inventor
Herbert T Bardwell.
By Chapin & Co
Attys.

(No Model.)　　　19 Sheets—Sheet 5.
H. T. BARDWELL.
VERTICAL SPINNING MULE.
No. 384,496.　　　Patented June 12, 1888.
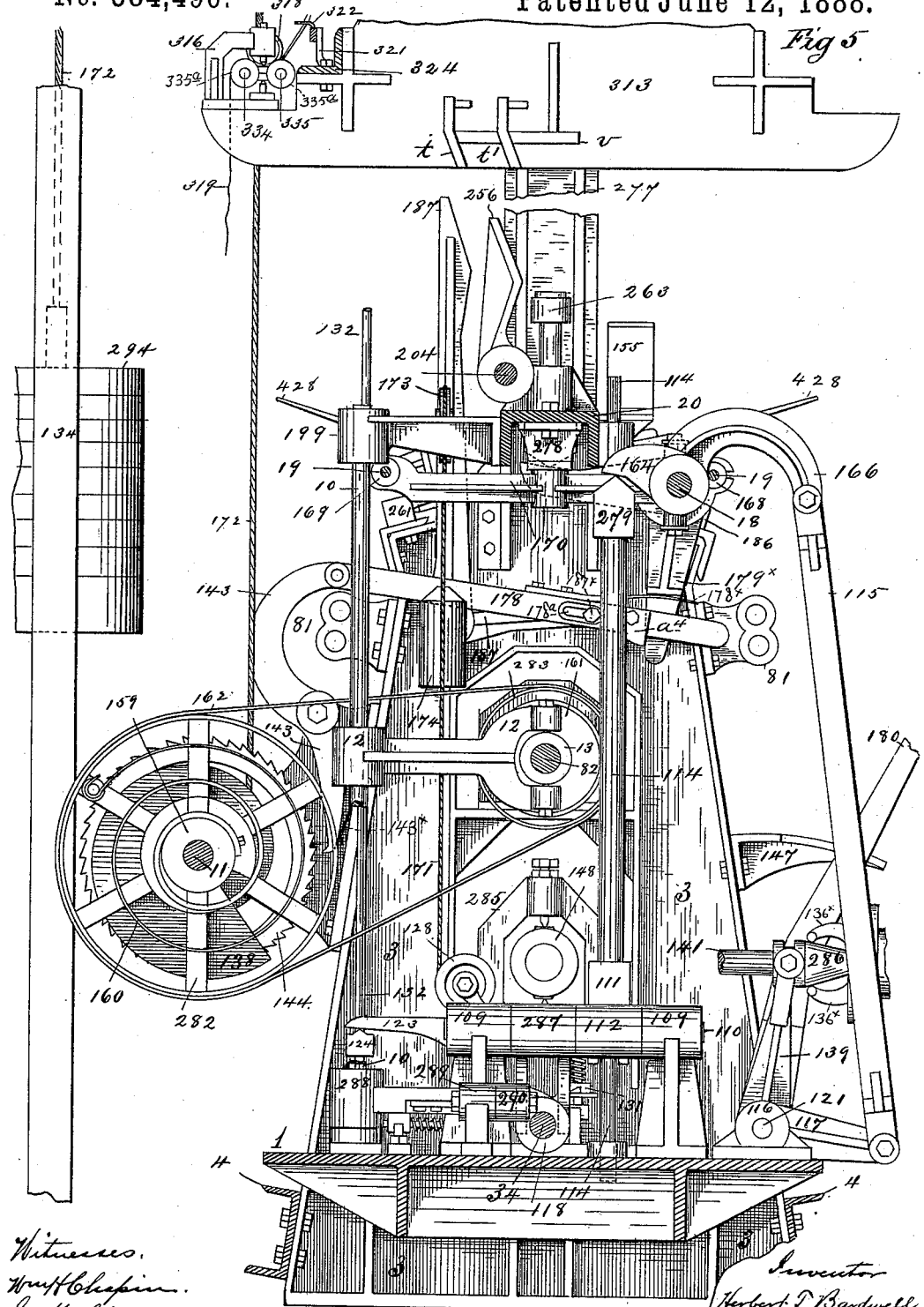

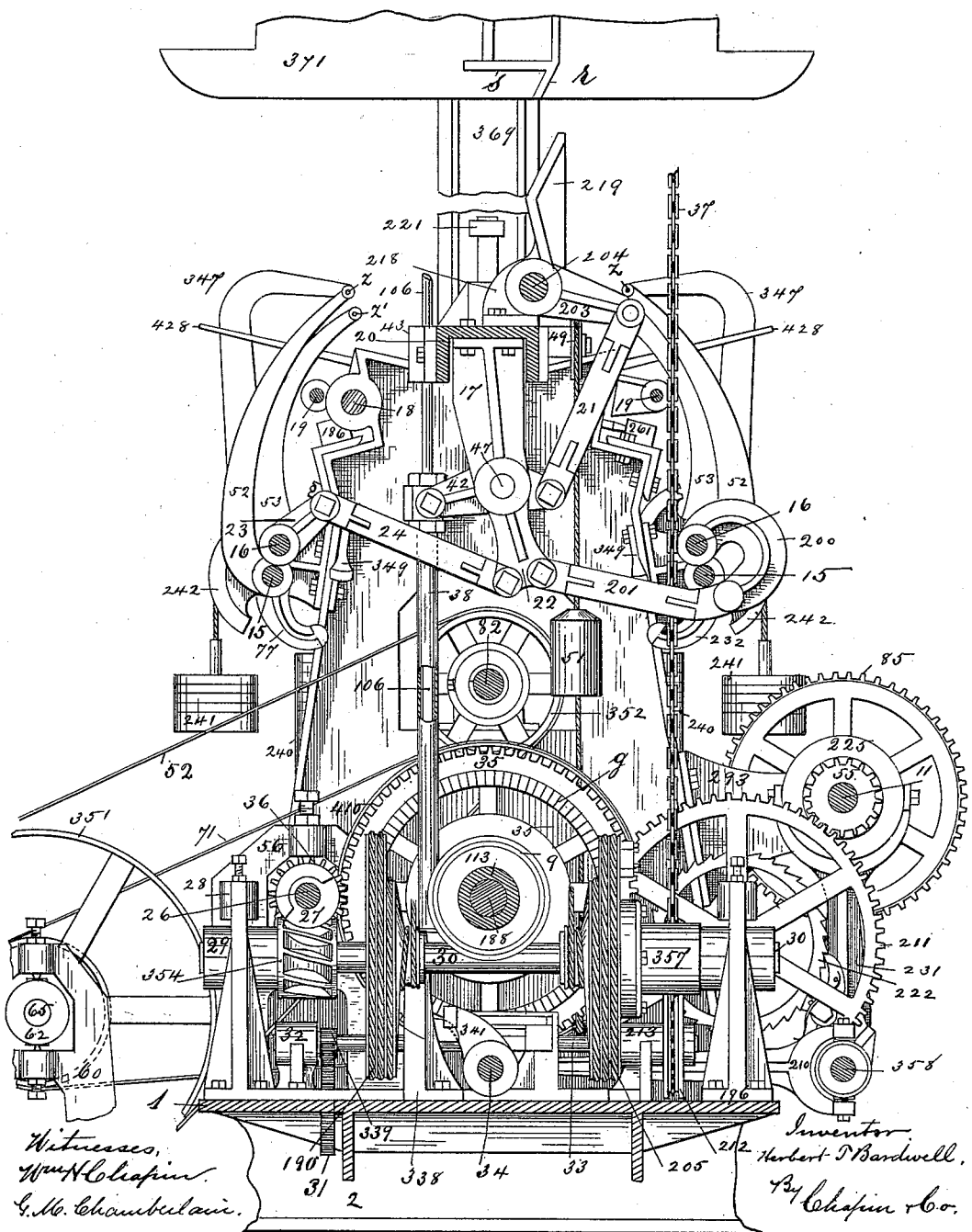

(No Model.) 19 Sheets—Sheet 7.
H. T. BARDWELL.
VERTICAL SPINNING MULE.
No. 384,496. Patented June 12, 1888.
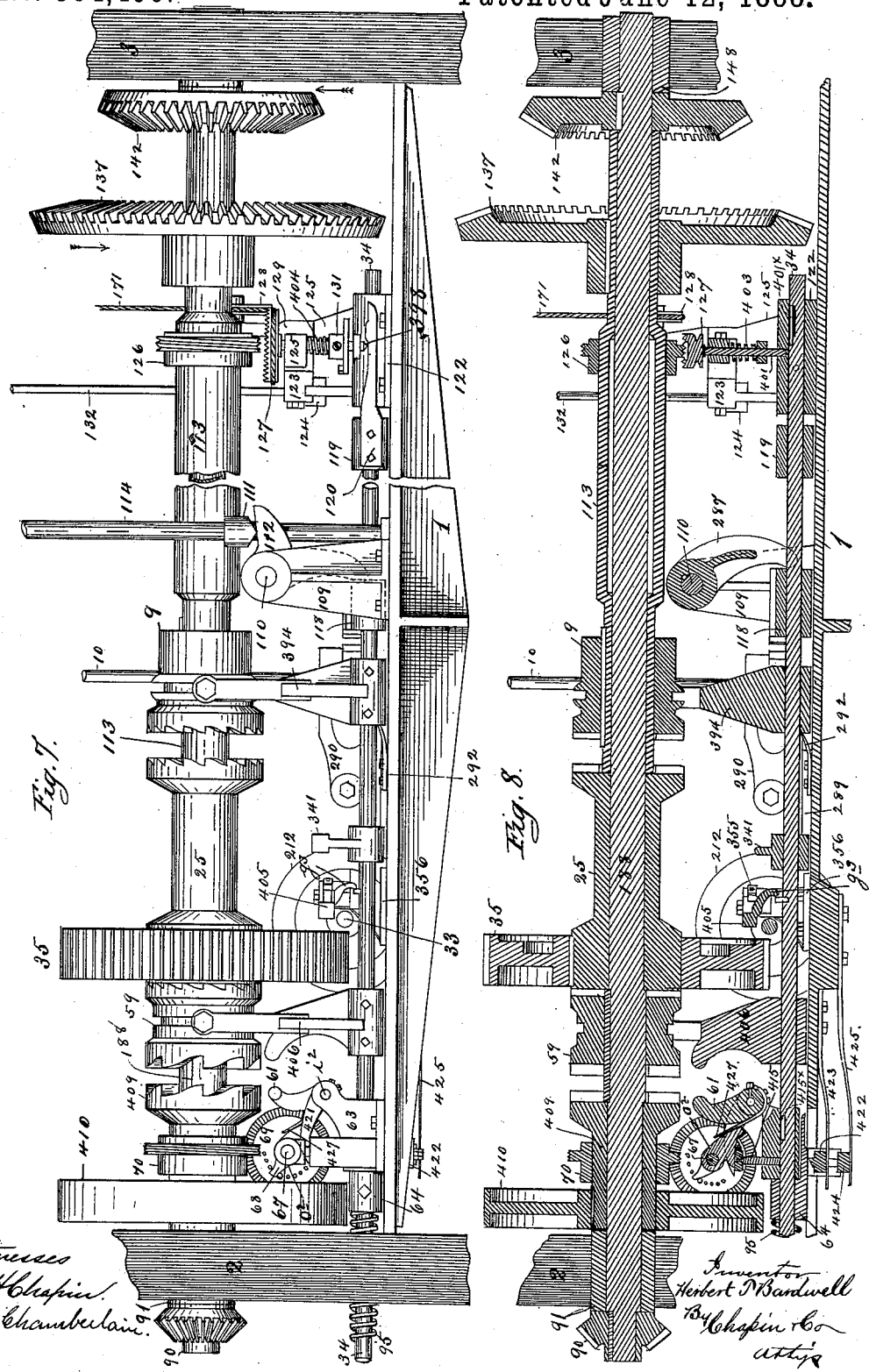

(No Model.)  H. T. BARDWELL.  19 Sheets—Sheet 8.
VERTICAL SPINNING MULE.
No. 384,496.  Patented June 12, 1888.
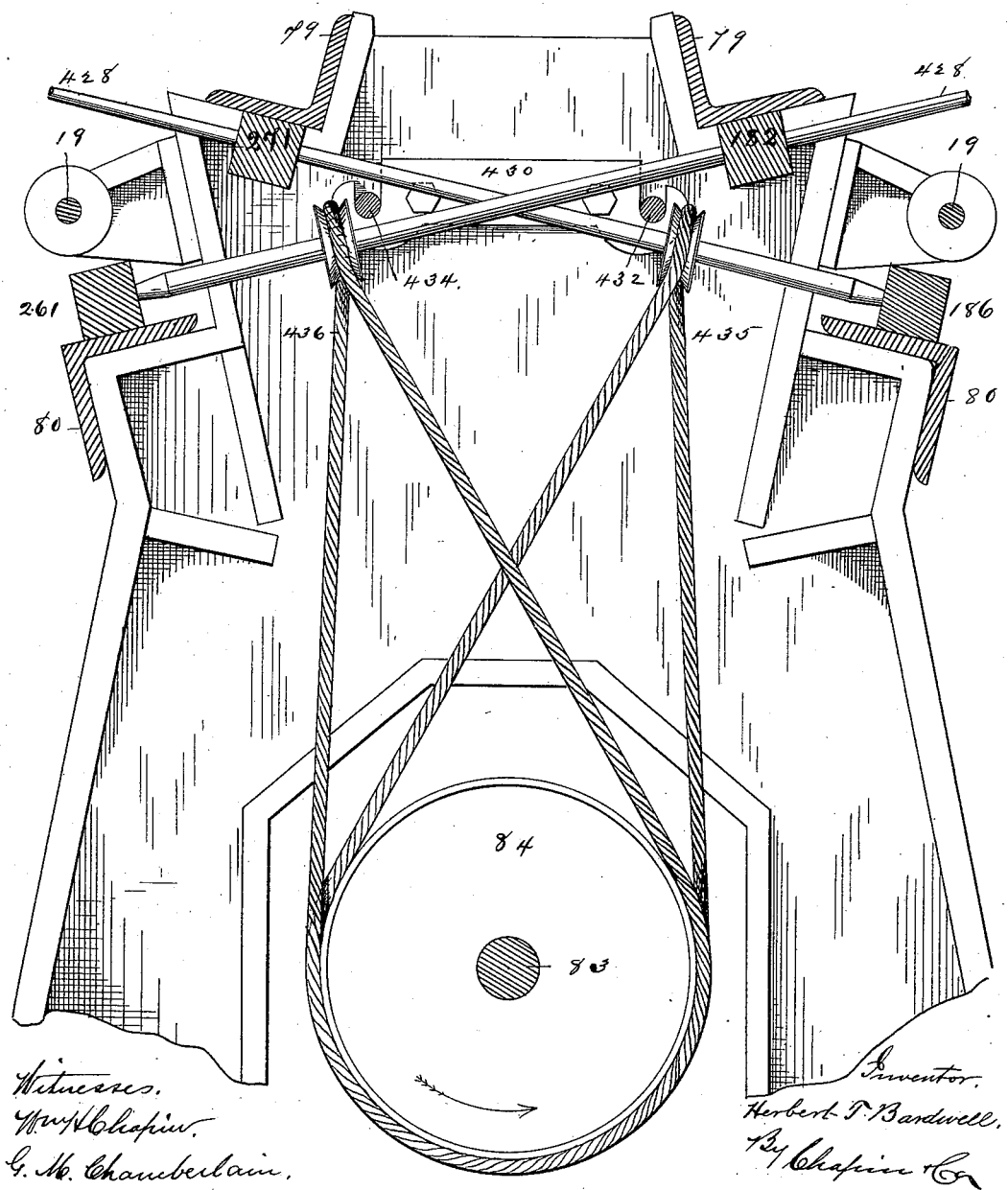

(No Model.)

19 Sheets—Sheet 9.

H. T. BARDWELL.
VERTICAL SPINNING MULE.

No. 384,496. Patented June 12, 1888.

Witnesses
Hur H Chapin
G. M. Chamberlain.

Inventor,
Herbert T Bardwell
By Chapin & Co
Att'ys.

N. PETERS, Photo-Lithographer, Washington, D. C.

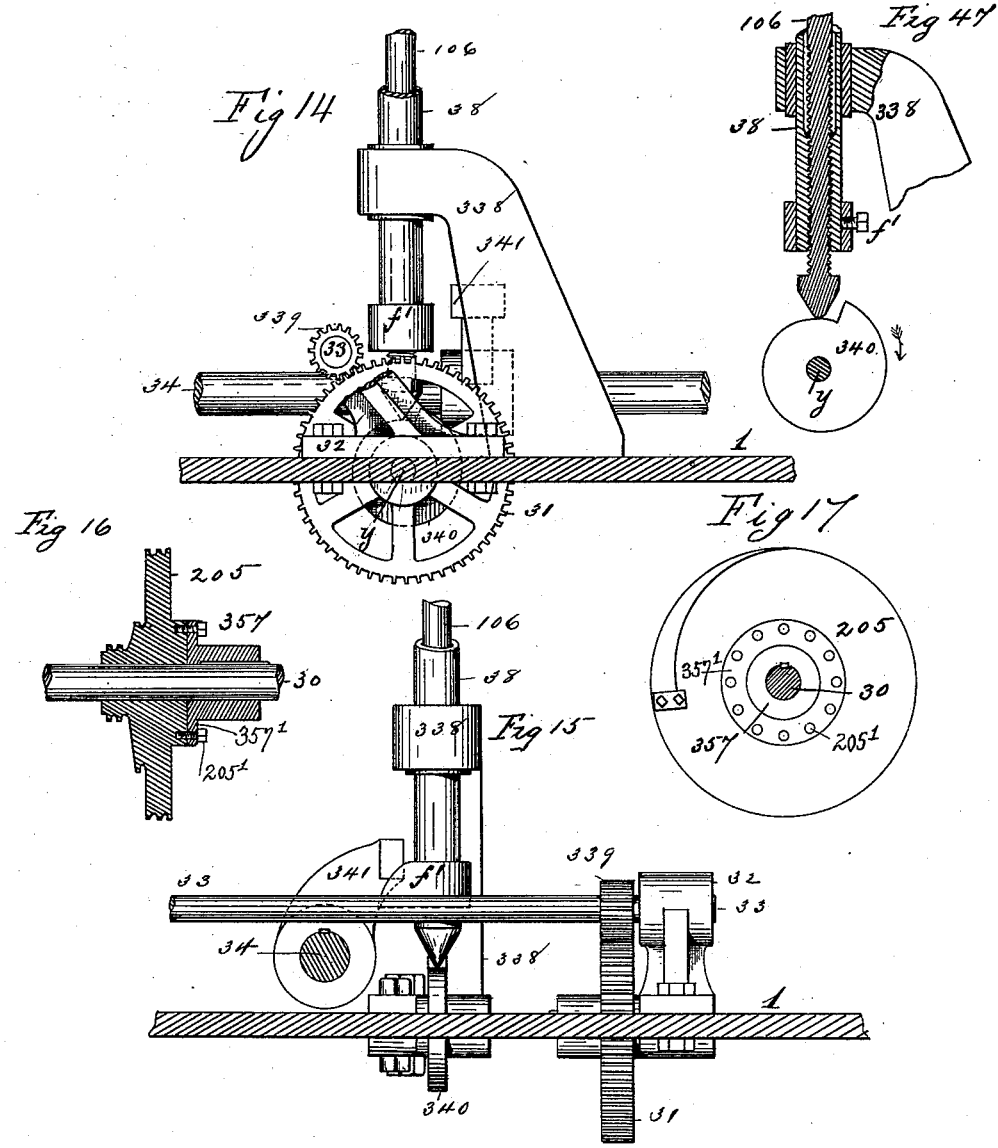

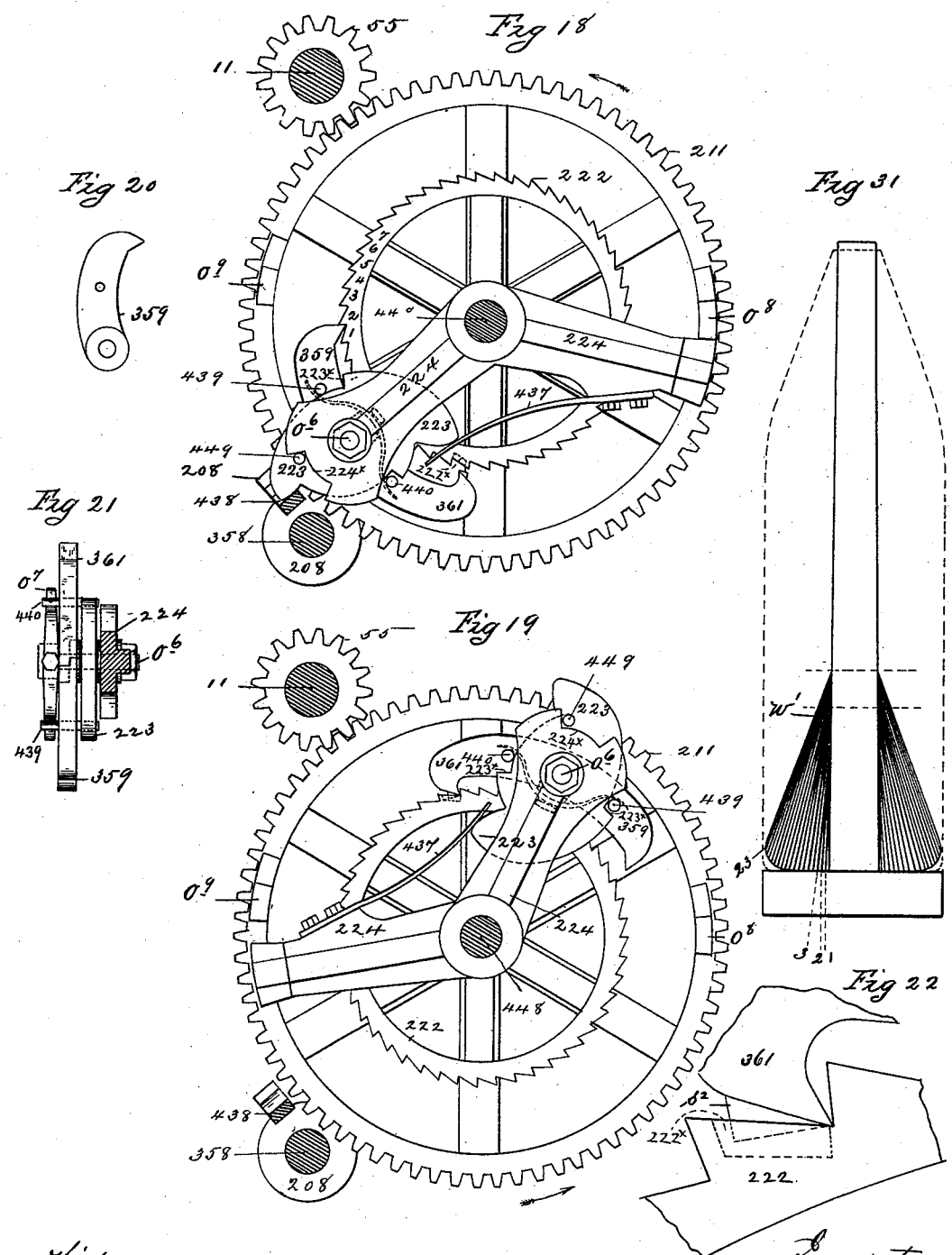

(No Model.) 19 Sheets—Sheet 12.
H. T. BARDWELL.
VERTICAL SPINNING MULE.
No. 384,496. Patented June 12, 1888.
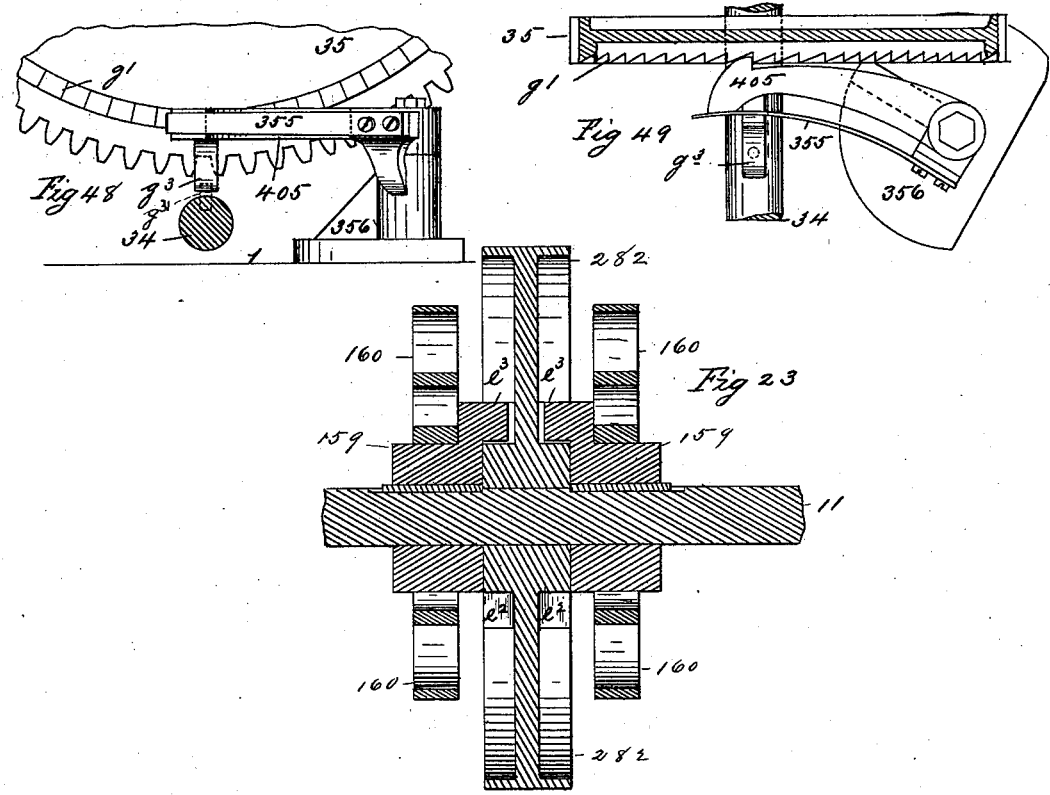
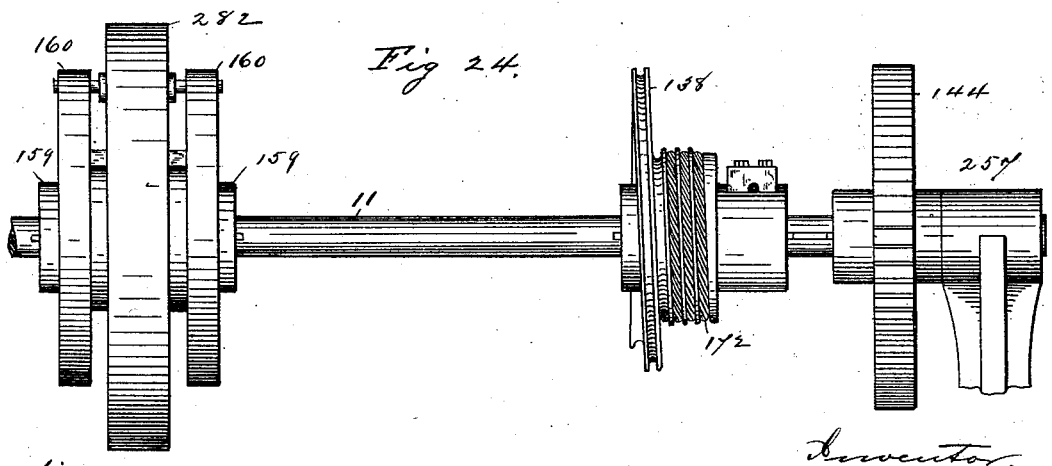
Witnesses.
Wm H Chapin
G. M. Chamberlain.
Inventor.
Herbert T Bardwell,
By Chapin & Co.
Attys.

(No Model.) H. T. BARDWELL. 19 Sheets—Sheet 13.
VERTICAL SPINNING MULE.
No. 384,496. Patented June 12, 1888.
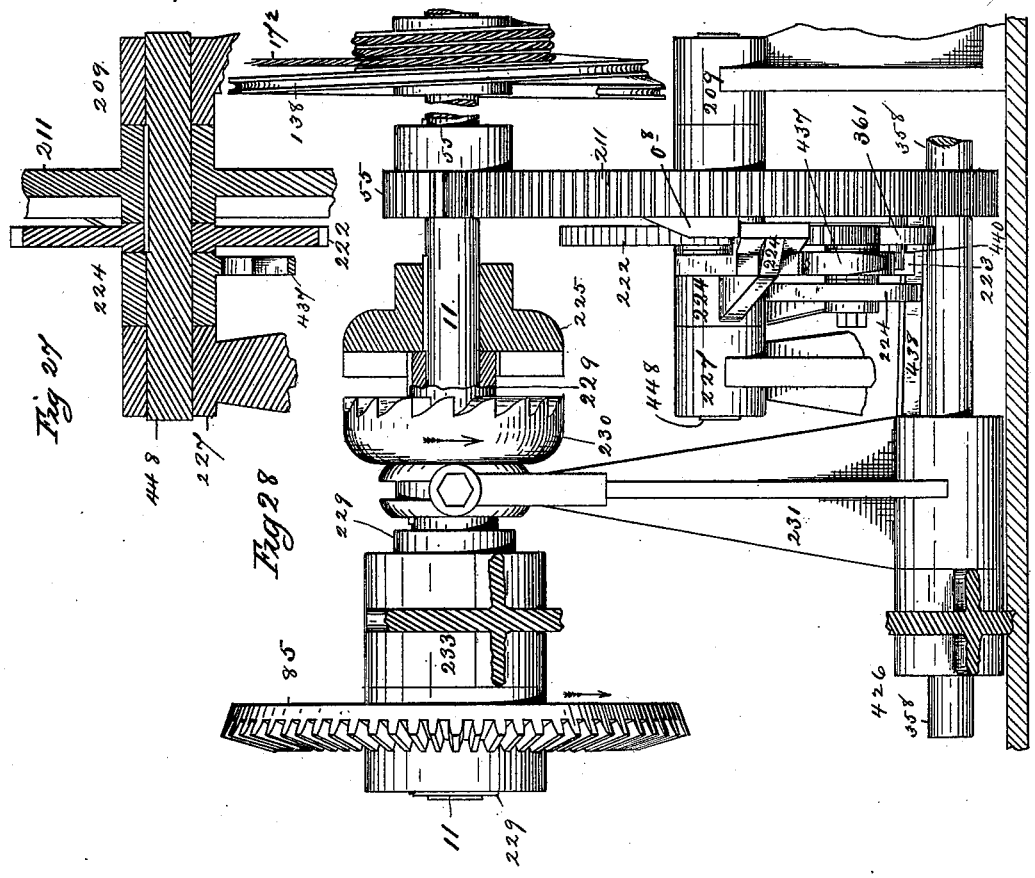
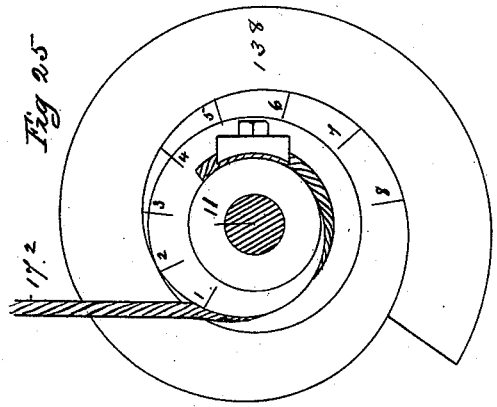
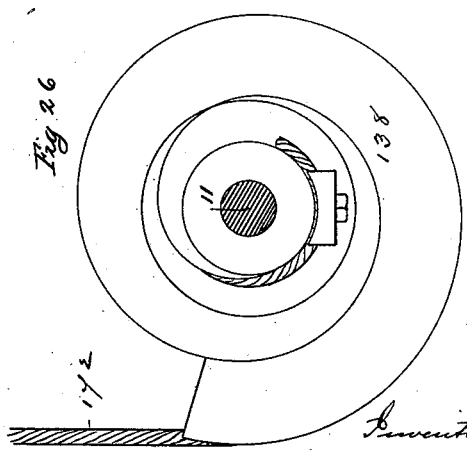
Witnesses.
Wm H Chapin.
G. M. Chamberlain.
Inventor.
Herbert T Bardwell.
By Chapin & Co.
Attys.

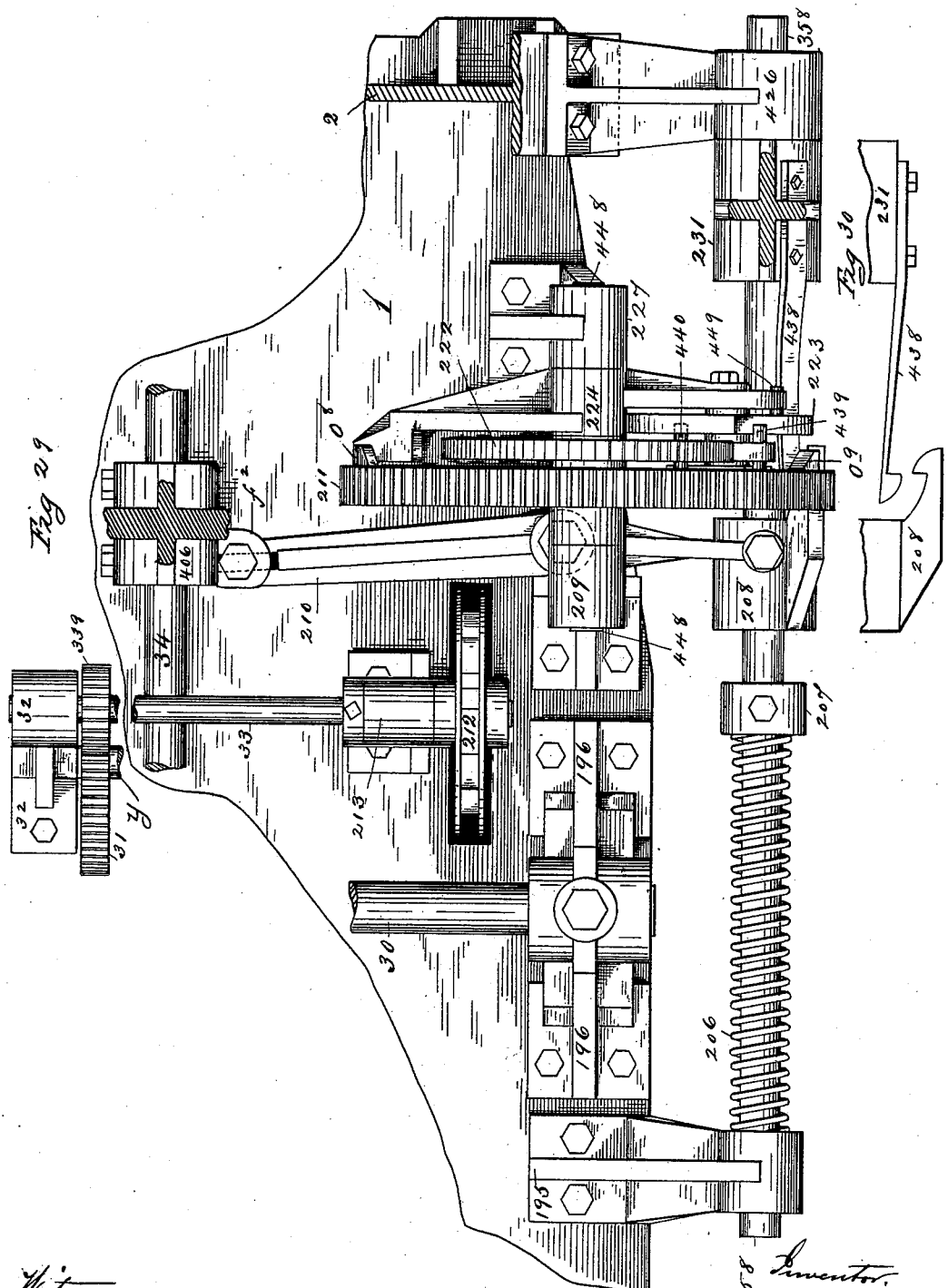

(No Model.) 19 Sheets—Sheet 15.
H. T. BARDWELL.
VERTICAL SPINNING MULE.
No. 384,496. Patented June 12, 1888.
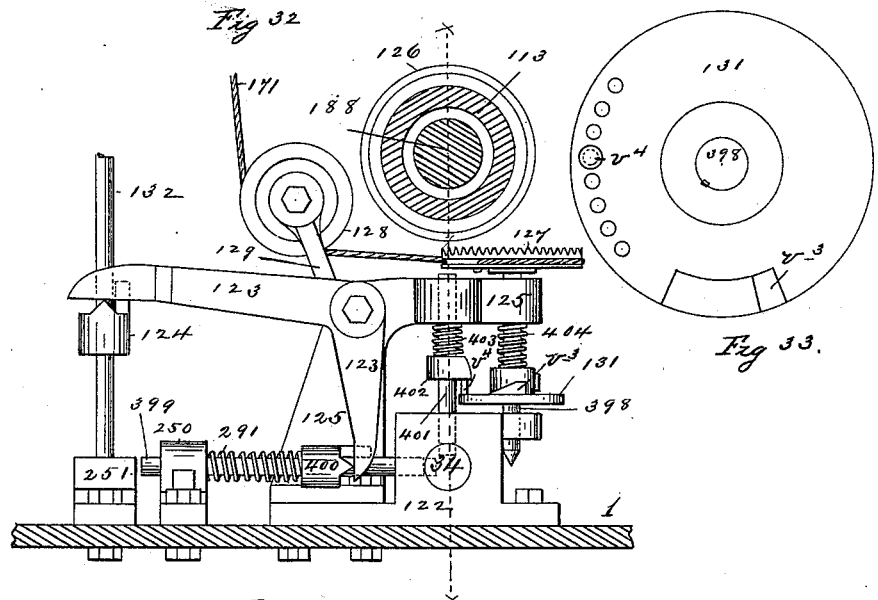

(No Model.) 19 Sheets—Sheet 16.
H. T. BARDWELL.
VERTICAL SPINNING MULE.
No. 384,496. Patented June 12, 1888.
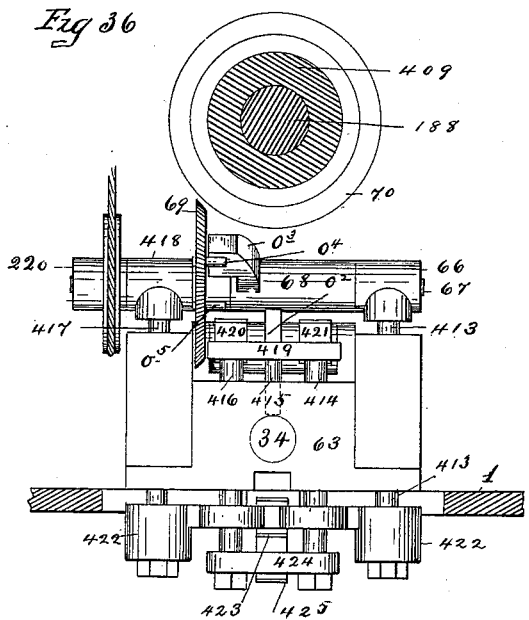
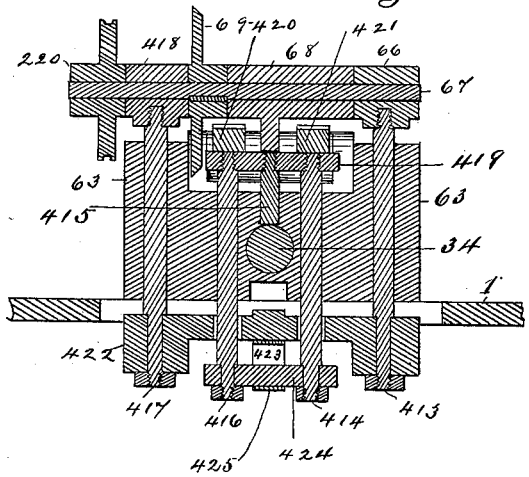
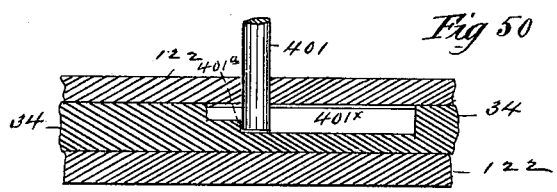

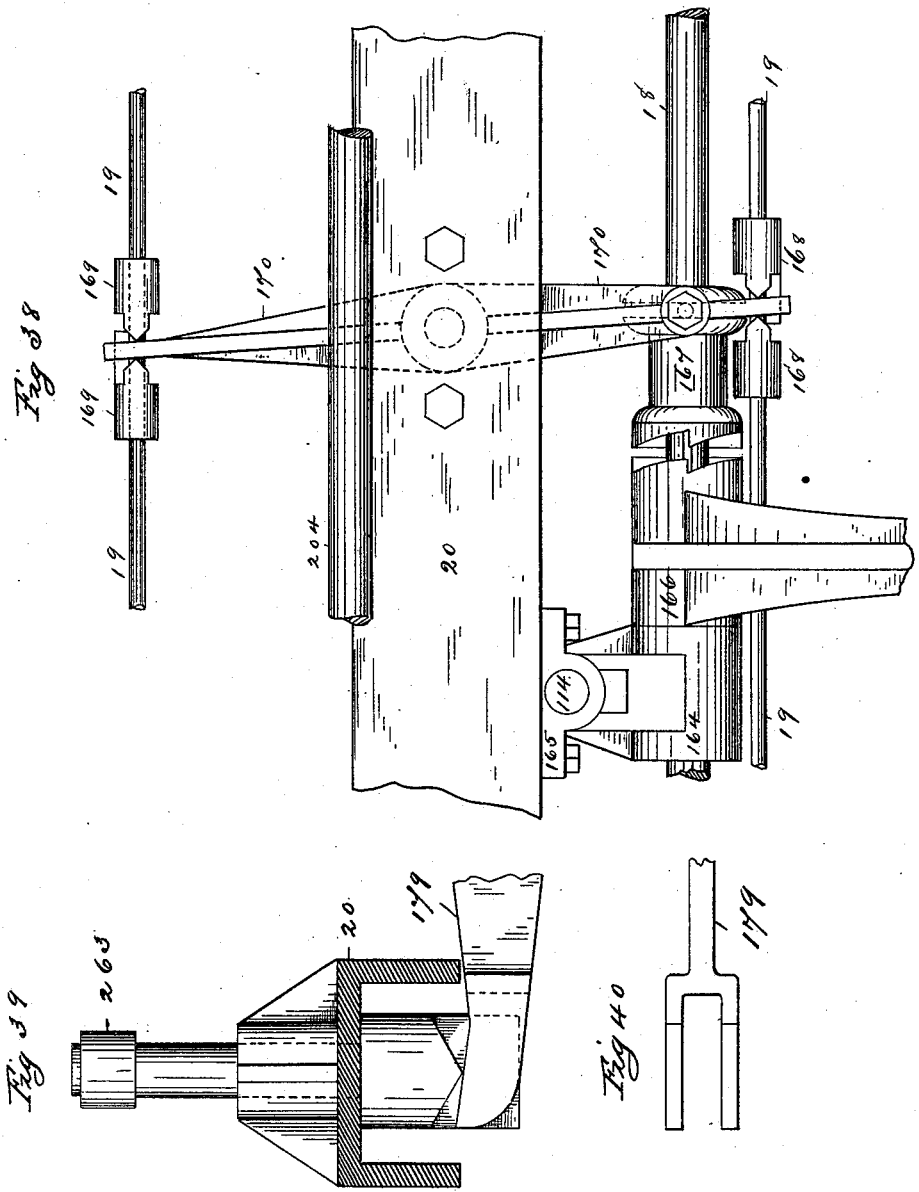

(No Model.) 19 Sheets—Sheet 18.
H. T. BARDWELL.
VERTICAL SPINNING MULE.
No. 384,496. Patented June 12, 1888.
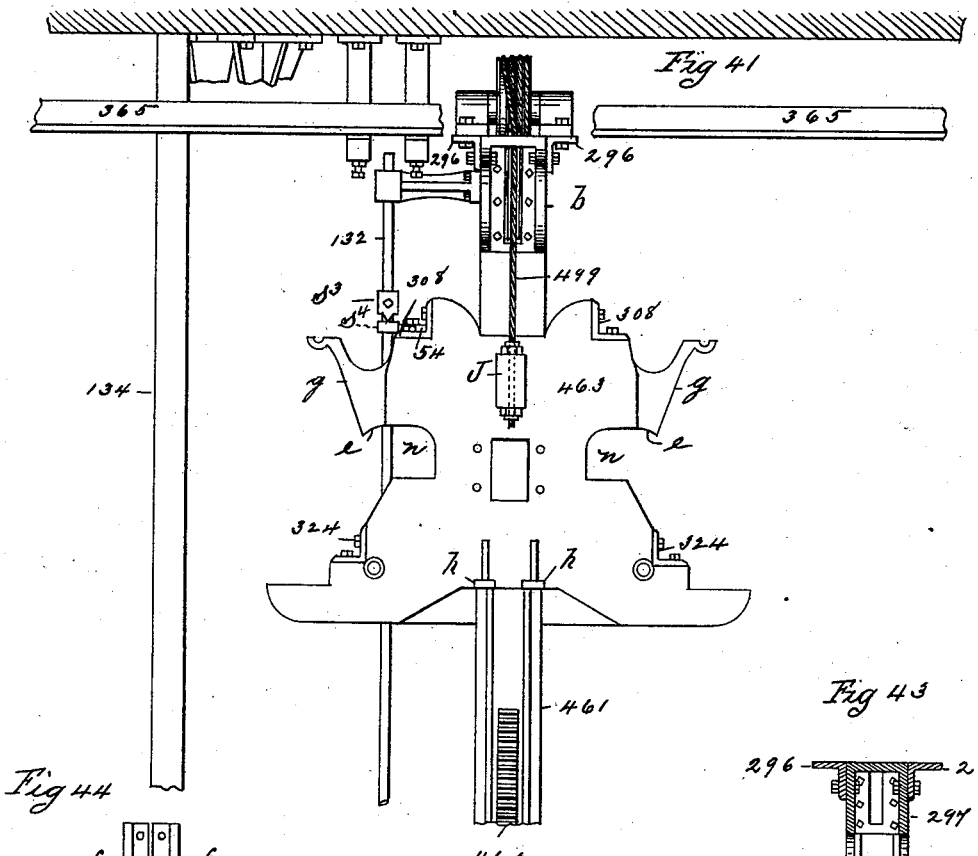
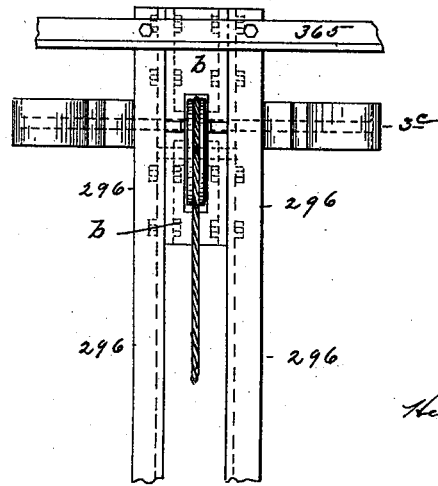
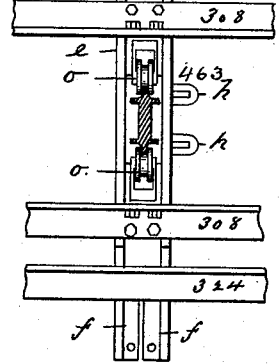

(No Model.)

19 Sheets—Sheet 19.

H. T. BARDWELL.
VERTICAL SPINNING MULE.

No. 384,496.

Patented June 12, 1888.

Witnesses
W. F. Rice
G. M. Chamberlain

Inventor.
Herbert T. Bardwell
By Chapin &co
Attys

UNITED STATES PATENT OFFICE.

HERBERT T. BARDWELL, OF SPRINGFIELD, MASSACHUSETTS.

VERTICAL SPINNING-MULE.

SPECIFICATION forming part of Letters Patent No. 384,496, dated June 12, 1888.

Application filed March 10, 1887. Serial No. 230,401. (No model.)

*To all whom it may concern:*

Be it known that I, HERBERT T. BARDWELL, a citizen of the United States, residing at Springfield, in the county of Hampden and State of Massachusetts, have invented new and useful Improvements in Vertical Spinning-Mules, of which the following is a specification.

This invention relates to improvements in spinning-mules, the object being to provide an improved machine of this class capable of vertical instead of horizontal operation, whereby the machine requires much less floor-space for its operation than do other mule-spinners heretofore made, besides possessing other advantages hereinafter set forth; and the invention consists in the peculiar construction and arrangement of the machine, all as hereinafter fully described, and pointed out in the claims.

Figure 2:
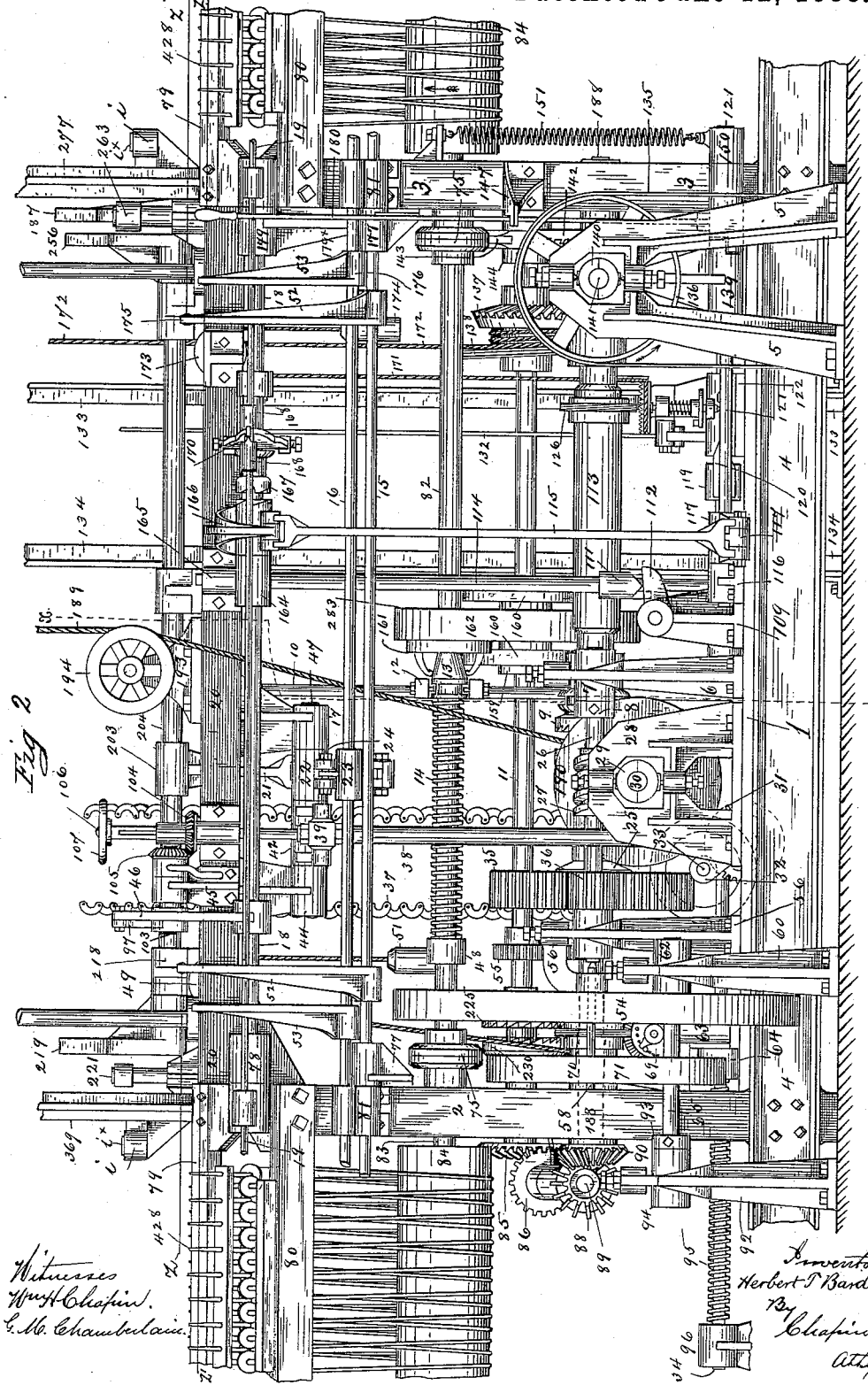
Figure 3:
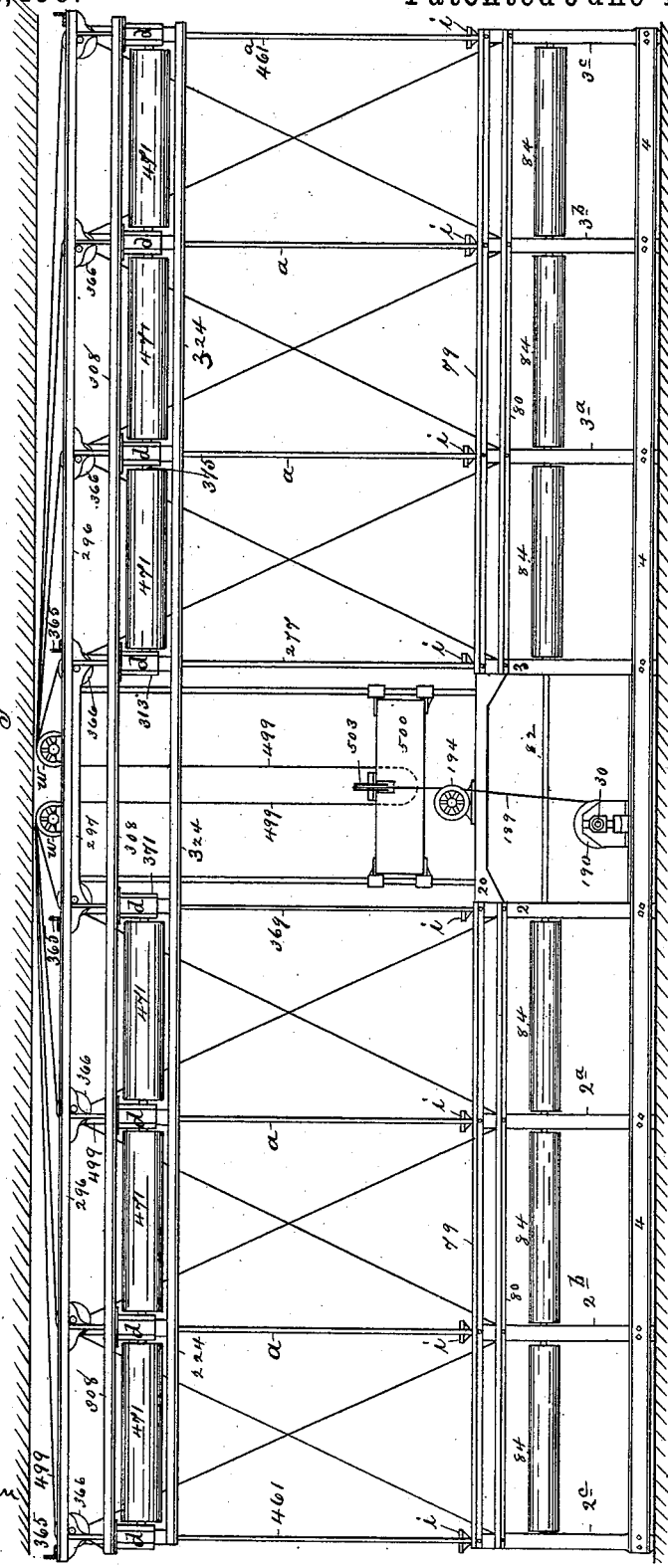
Figure 4:
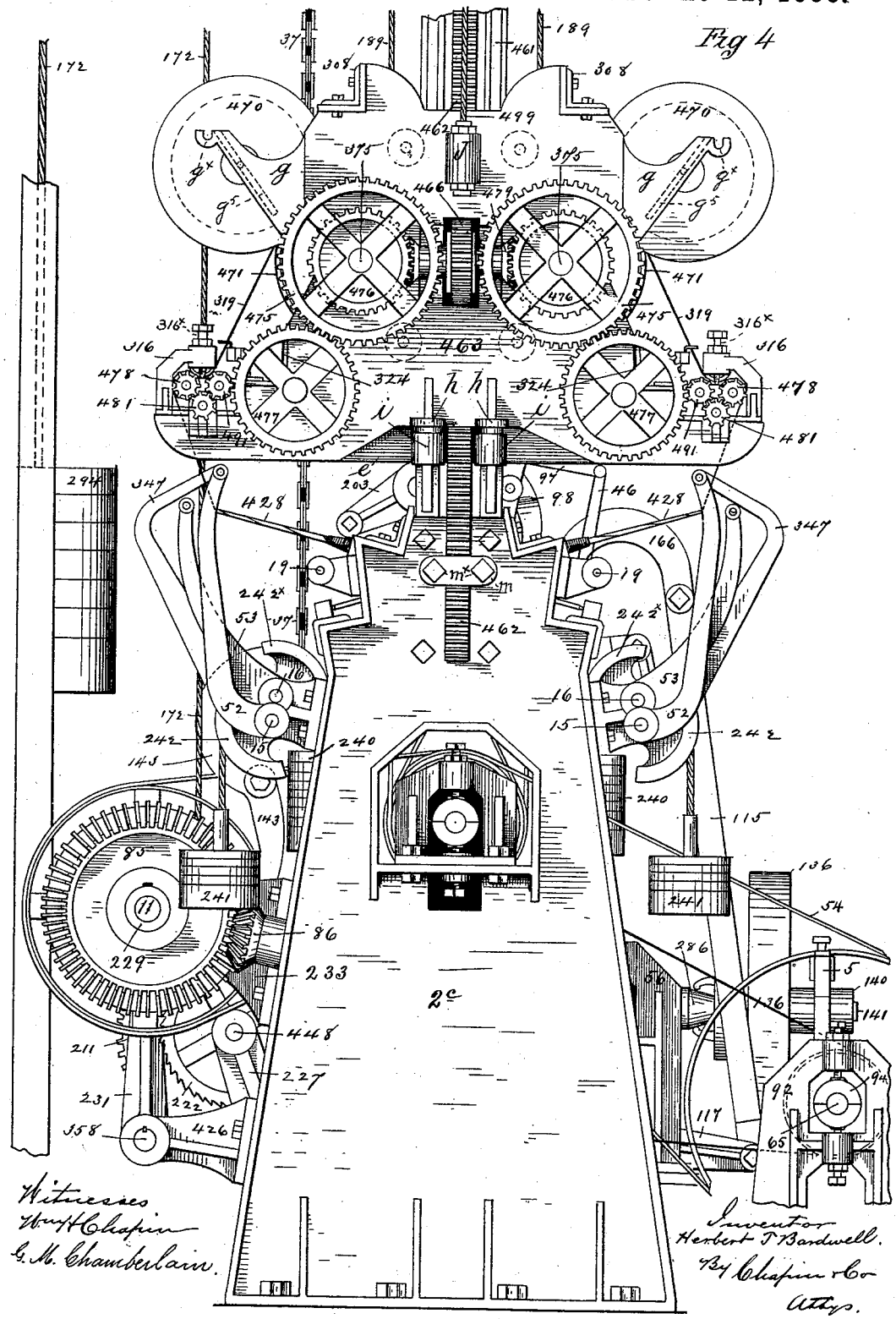
Figure 46:
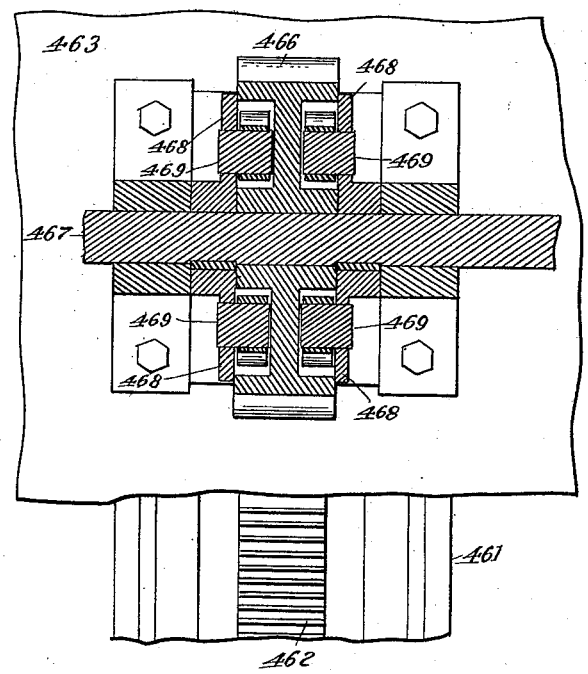
Figure 45:
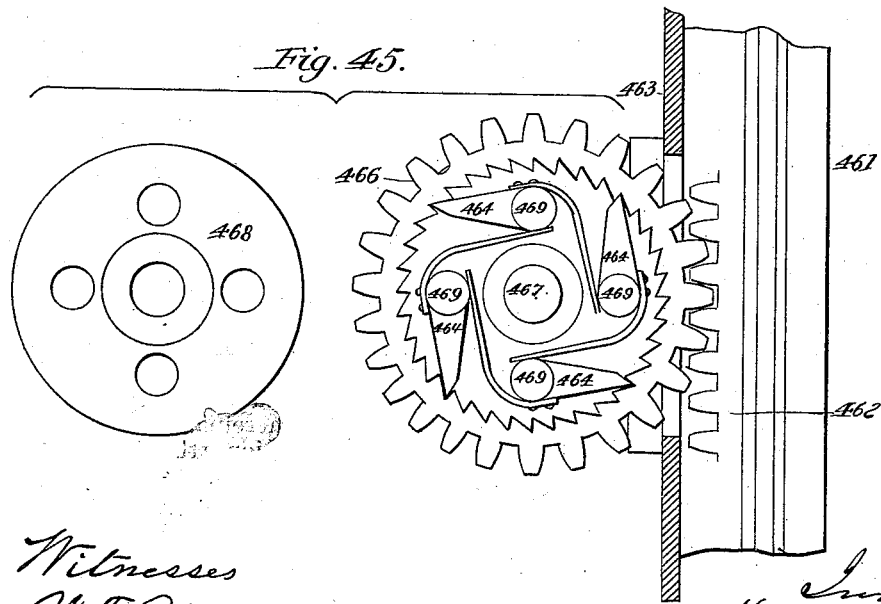

In the drawings forming part of this specification, Figure 1 is a front elevation of the head of the machine, showing the detail parts as completely as is possible in a drawing which is necessarily so greatly reduced, and of portions thereof extending laterally from each side of the head, and showing a front view of one of the end frames of the mule, said end frame and the parts attached thereto being shown broken away from the parts which are attached to the head. Fig. 2 is a front elevation of the lower portion of the head of the machine and of portions thereof extending laterally from each side of the head, this figure showing in detail all of the operating parts of said portion of the head which are visible in front view, the parts in said figure being made upon as large a scale as the sheet permits of. Fig. 3 is a front elevation of the frame of the machine, showing the carriage thereof at its highest position and certain operative parts, hereinafter described. Fig. 4 is an end elevation showing the upper part of the machine broken off and the carriage at its lowest position, a part of the frame of the machine being shown with its upper and lower ends broken off. Fig. 5 is a vertical section on line *x x*, Fig. 2, looking toward the right in said figure, a cross-shaft being shown broken off and its supporting-standard (shown in Fig. 2) not being shown, as hereinafter described, said figure showing, also, a part of the carriage. Fig. 6 is a vertical section on the same line, Fig. 2, as Fig. 5, but looking to the left in Fig. 2, this figure showing also a portion of the carriage. Fig. 7 is a front elevation of the main driving-shaft of the machine, portions of the frame of the latter, and of operative mechanism connected with said shaft, all as below described. Fig. 8 is a longitudinal section of the shaft, portions of the frame, and certain opertive parts shown in Fig. 7, as hereinafter fully described. Fig. 9 is a vertical sectional view (somewhat enlarged) through the frame to the left of the head of the machine in Fig. 3, showing the side of one of the partitions below described, an end view of one of the driving-drums, and two of the spindles and their band-connections with the drum. Figs. 10 to 15, inclusive, are detail views of the mechanism for regulating the building of the yarn on the bobbins, all of which are hereinafter fully described. Fig. 16 is a sectional view of one of the carriage-operating scrolls, together with its hub and shaft, the latter being in elevation; and Fig. 17, an end view of said hub and scroll, the shaft being in section, all of which are fully described below. Figs. 18 to 30, inclusive, illustrate detail parts of devices for regulating the tension of the yarn while it is being wound on the bobbin and for winding the yarn thereon, all as hereinafter fully described. Fig. 31 is a side elevation of a bobbin, showing thereon at its base the yarn-cone and in dotted lines the outline form of the full bobbin. Figs. 32 and 33 are detail views of devices co-operating with a shipping-shaft under the main shaft (see Figs. 7 and 8) to regulate one of the several longitudinal movements of said shipping-shaft, as is fter fully set forth, Fig. 32 showing a section oi he main shaft of the machine and a worm thereon. Figs. 34 and 35 illustrate detail parts of the devices which set in operation the "backing-off" mechanism. Fig. 36 is a side elevation, and Fig. 37 is a vertical section, of detail parts of the machine for regulating the amount of twist given to the yarn through said shipping-shaft, Fig. 36 showing a sectional view of the said main shaft and a side view of a worm thereon, all of which is fully explained below. Fig. 38 illustrates detail parts in plan view of shipping mechanism for stopping the carriage at the bottom of its descent and for starting the same when it has been so stopped, as hereinafter described. Figs. 39 and 40 are views of detail parts hereinafter fully described. Fig. 41 is an elevation of the upper end of the frame of the machine and of one of the ends of the carriage, this figure showing the relation of the upper end of the machine to the ceiling of the room in which it is located, (a part of said ceiling being there shown,) and also certain hangers and parts thereof pending from the ceiling, (below described,) a part of a horizontal angle-iron forming a lateral brace for the top of the machine when several of the latter are set side by side, and also a portion of one of two weight-guiding posts (shown in Fig. 1) and a vertical rod having its upper end supported in an arm fixed on the side of the frame, said rod co-operating with the aforesaid devices shown in Fig. 32, as below described. Fig. 42 is a plan view of one end of the frame of the machine, showing attached thereto a portion of the above-mentioned angle-iron brace. Fig. 43 is a vertical section through line $xx$ at the top of the frame of the machine in Fig. 1 and a side view of a portion of one of the vertical posts of said frame. Fig. 44 is a top plan view of one pair of the carriage-plates and portions of the angle-irons which connect them and with said plates form the carriage-frame, said figure showing a section of one of the aforesaid posts between said plates. Fig. 45 is a side elevation of a ratchet-gear and its side plate, (the latter being removed from the gear,) showing a section of a part of one of the frame-plates of the carriage and of one of the posts and a part of a rack on the latter. Fig. 46 is a vertical section of the gear, its shaft, and boxes shown in Fig. 45, and showing the shaft-boxes, a portion of the machine on which it is hung, and a part of one of the posts of the machine and of the rack with which said gear engages. Fig. 47 is a further detail in side elevation, partly in section, of portions of the yarn-building mechanism shown in Fig. 14 and fully described below. Figs. 48 and 49 are side and plan views, respectively, of a part of the gear which actuates the carriage-raising mechanism and of devices to engage with said gear and prevent, temporarily, its rotation, as and for the purpose below described. Fig. 50 is a detailed section of a portion of a shipper-rod and in elevation of a stop-pin acting in conjunction therewith, all as fully described below.

The herein-described mule-spinner consists, generally, of a vertical frame, as shown in Fig. 3, and of end and intermediate transverse supporting-standards or frame-posts, 2, $2^a$, $2^b$, and $2^c$ and 3, $3^a$, $3^b$, and $3^c$, said vertical frame extending above said standards and secured thereto, and consisting of end posts 461 and $461^a$ and intermediate posts $a$, four in number, more or less, as the length of the machine may require. The said posts are properly tied and supported by suitable diagonal braces, as shown in Fig. 3. The feet or lower ends of said standards are suitably tied together by a longitudinal angle-iron, 4, either double or single, as shown in Figs. 1, 2, 3, and 5, which is bolted to the front and rear edges of the said standards. The upper ends of said posts are tied together by a longitudinal angle-iron, 296, on opposite sides thereof, (see Figs. 1, 3, 41, and 42,) a box-bracket, $b$, being fixed between said angle-irons on the opposite sides of the upper ends of each of said posts 461, $461^a$, and $a$, the employment of said box-brackets at the upper ends of the posts 369 and 277, near the center of the machine, (see Fig. 3,) being obviated by placing on the upper central part of the frame an inverted-U-shaped iron girder, 297, the ends of which extend beyond and are fixed to the ends of said posts 369 and 277, as shown, and said angle-irons 296 are secured on the opposite sides of said girder, the latter being built into said central part of the frame in order to impart to it the requisite strength and rigidity to sustain the weight of the carriage and its counterbalancing-weight 500. (See Fig. 1.)

The above-referred-to carriage constitutes that part of the mule-spinner on which are carried the roving-spools, the rollers on which they lie and turn, the delivery-rollers between which the rovings pass to the spindles, and the mechanism which imparts the proper motion to said rollers and other operative parts of the machine, as below described. Said carriage consists of several pairs of suitable metal plates, one thereof, 463, being shown in side view in Fig. 4, the plate $e$, which, with the latter, makes said pair, being secured opposite the rear side of plate 463 by the longitudinal angle-irons 308 and 324, (see Figs. 1, 3, 4, 5,) which angle-irons extend the whole length of the carriage on opposite edges of said plates, and to the latter, as shown, said angle-irons are bolted. Each pair of said carriage-plates is indicated in Fig. 3 at $d$. In Fig. 44 is shown a top plan view of one of said pairs of plates, together with parts of said angle-irons, which are bolted thereto.

The plates 463 and $e$ are provided with projecting webs $f$ on their inner opposite sides, which serve to hold the plates a certain distance apart, as shown in Fig. 44, to provide a central opening between them in the direction from their lower to their upper edges, through which the posts 461, $461^a$, and $a$ pass; and between said plates opposite the sides of said post passage are hung friction-rollers $o$. (Shown in Fig. 44 and in dotted lines in Fig. 4.) The peripheries of said rolls $o$ are grooved to engage with each edge of said post, and thereby the plates are guided without friction while the carriage of which they are a part is moved vertically on said posts. Between those parts of said plates which project beyond the angle-irons 324 are provided perforated abutting-webs $f$, which serve as a base on which to bolt the foot of an arm, 316, in the upper end of which is a set-screw, $316^x$, as shown in Fig. 4.

On the front and rear edge of the aforesaid plate $e$ is an arm, $g$, having a bearing, $g^x$, in its upper end to receive the end of the shaft of the roving-spools, hereinafter described, when said spools are lifted off from the drums beneath them on which they lie when the machine is in operation. Said arms $g$ are shown in Fig. 4 and in Fig. 41. The inner side of the arm $g$ has a groove, $g^5$, therein, as shown in dotted lines, in which groove the ends of said spool-shaft engage when in operative position, the engagement of the shaft with the groove serving to retain said spool in proper position to permit it to rotate, and allowing the spool to adjust itself to its varying positions relative to the drum on which it lies as the roving thereon is gradually unwound. The said roving-spools are provided with a flange at each end, as shown in Fig. 1, the borders of which project slightly over the ends of the drum 471 and aid in keeping the roving-spools in proper position on said drum.

On the side of each pair of the plates 463 and $e$ are formed lateral projections $h$ at their lower edges, which are adapted to strike against suitable elastic material (a rubber plug, $i^*$, is shown) placed in bunter-cups $i$, which are secured on the side or sides of each of the said posts on which the said carriage-plates have their vertical movements. Said cups $i$ are secured near the lower end of said posts, as shown in Figs. 1, 2, 3, and 4. The interposition of said elastic material between the said stops $h$ and said cups serves to obviate any sudden shock when the downward movement of the carriage is arrested by the striking of said stops against the bunters.

On the side of one of each pair of carriage-plates is a cylindrical or other suitably-formed stud, J, (see Figs. 4 and 41,) said stud being perforated longitudinally, as shown in dotted lines in Fig. 41, to provide for passing the end of a wire rope, 499, through it and for suitably attaching the end of said rope to the frame-plate.

A rack, 462, is secured adjustably against the outer side of each of the posts 461 and 461$^a$ by a strap, $m$, which is held against the lower end of said rack by two bolts, $m^\times$ $m^\times$, which pass through said straps into the standard to which said posts are secured, as shown in Fig. 4. By said means the rack is rigidly held in a vertical position against the side of said post and extends between the aforesaid carriage-plates nearly to the upper end of said post, as shown in Fig. 41. By means of said strap-fastening the said rack may be adjusted vertically.

Fig. 41 shows the carriage above the upper end of the rack 462. While the gear 466 is in engagement with said rack during the upward movement of the carriage, the delivery-rolls of the latter are in operation; but when the gear 466 runs off the upper end of said rack said delivery motion ceases, and during the further movement of the carriage the required draft is given to the yarn while it is being twisted. By said vertical adjustment of the rack 462 the extent of the movement of the carriage, after said gear 466 is disengaged from the rack is determined, and consequently the said draft of the yarn is increased or diminished.

The plate 463, which is one of the aforesaid pair of carriage-frame plates, is provided with a perforation of rectangular or other suitable form, as shown in Figs. 4 and 41, and on opposite sides of said perforation are bolted suitable boxes against the sides of said plate, in which is placed a short shaft, 467, having thereon a gear, 466, having ratchet-connection with its shaft, as shown in detail in Figs. 45 and 46, within said perforation in the plate, and engaging with the aforesaid rack 462, and on each end of said short shaft is fixed a beveled geared pinion, 479. By said ratchet-gear connection the shaft on which are the pinions 479 is made to rotate only when the carriage rises, so that rovings will be given out only while the carriage is moving upward. In recesses $n$ in the opposite edges of the said carriage-frame plates (see Fig. 41) are secured suitable boxes, $q$, (see Fig. 1,) in which one end of the shaft on which the drum 471 is fixed, the opposite end of said shaft having a bearing in a suitable box on the frame-plates on post 277, (see Fig. 3,) said shaft, which is indicated by 375, having intermediate bearings in the carriage-frame plates $d$ on posts $a$.

By reference to Fig. 4, which is an end view of the machine excepting the upper end of the frame thereof, it is seen that two shafts, 375, are located in the carriage each side of the central portion of the machine, as shown in Fig. 3, and on opposite sides of the carriage, each of said shafts being provided with the said drums 471, as shown in Figs. 3 and 4.

Fig. 4 shows the operating parts of the machine, which are attached to the carriage-frame plate at each end of the mule-spinner, and those frame-plates have their vertical movements on the upright posts 461 and 461$^a$ of the machine. The said operating mechanism, which is attached to said frame-plates at the ends of the carriage, is not shown in Fig. 3 for want of room to illustrate, but Fig. 4 clearly shows the arrangement thereof. The aforesaid shafts 375 have their ends projecting beyond the outer face of the said frame-plates at the ends of the carriage, and the ends of said shafts have fixed thereon a double gear, 475 476, which gears have an engagement with the aforesaid beveled pinions 479 and with intermediate gears, 477, having a free rotary movement on suitable studs on the end plate, 463. On each side of the carriage of the machine and below each of the said drums 471 are arranged suitable delivery-rollers, between which the rovings 319, which are drawn from the spool 470, pass on their way to the spindles 428, as shown in Fig. 4. The two lower of said delivery-rollers, 334$^a$ and 335$^a$, which are three in number, as clearly shown in Figs. 4 and 5, are hung on shafts 334 and 335, which have fixed thereon pinions 478 and 491, the latter engaging with the aforesaid intermediate gear, 477, and an intermediate pinion, 481, is hung under said pinions 478 and 491 and has an engagement with the latter-named two pinions, as shown in Fig. 4. The third delivery-roller, 318, or "top roller," of the usual construction, rests by gravity on the aforesaid two delivery-rollers. The boxes in which the ends of the said shafts 334 and 335 have their bearings are suitably supported on the said carriage-frame plates under the end of the above-referred-to arm 316, the said set-screw 316ˣ in the latter being screwed down against the upper side of said boxes to retain them in proper operative position.

From the above-described construction of the carriage of the machine it should be understood that said carriage consists of a series of said frame-plates united by angle-irons extending the whole length of the machine, the carriage-frame plates at each end of the machine carrying the geared connections shown in Fig. 4, which geared connections control the movements of the roving-spools and delivery-rollers which are on the carriage each side of the central portion of the machine, motion being imparted to said geared connections at each end of the carriage by means of the engagement of the gear 466 with the racks 462 on the end posts of the machine, said gear 466 being actuated by the reciprocating vertical movements of the entire carriage of the machine, as below described.

The aforesaid ratchet-gear 466, whose detail of construction is illustrated in Figs. 45 and 46, has a free rotation on the shaft 467 in one direction, and by means of ratchet-teeth, as shown, on the inner side of its rim said gear has an engagement with a series of pawls, 464, which are hung on pins 469 on two disks, 468—one on each side of said gear—which disks are keyed to said shaft 467, on which are secured the above-mentioned beveled gears 479. Thus when the carriage is moved upward the gear 466 engages with said pawls and the shaft 467 and all of the above-described gearing connected therewith is given a rotary motion; but when the carriage moves downward the gear 466 turns freely on its shaft and has no effect upon said gearing.

The above-described carriage of the machine is suspended by a series of wire ropes, 499, when not resting on the aforesaid bunter-cups i, said ropes being four in number, and all secured side by side about centrally between their ends in the weight 500, which serves as a counter-balance to the said carriage, but is somewhat lighter than the latter to permit the carriage to drop down when free from the restraining action of mechanism below described, and to actuate certain operative parts of the machine, as below set forth. Said ropes may be secured to the said weight in any suitable manner; but it is preferable to double them around a block having the form shown in dotted lines in Fig. 1, whereby the ropes have such a broad bearing that no danger exists of their being so bent or kinked as to impair their strength, said block being firmly secured in the weight by any suitable means. The ends of the said four ropes, which ropes are indicated by 499, (there being eight ends,) are carried upward from the said weight, as shown in Figs. 1 and 3, above the frame of the machine, and are drawn in opposite lateral directions from the center of the machine over said frame and over wheels w and pulleys 366 on the latter, and each of said rope ends is carried downward and secured to a pair of the above-described carriage-frame plates by being attached, as described, to the stud J thereon. (See Figs. 4 and 41.) The said counterbalance-weight 500 has a sliding connection, 501, with a suitable guide rod or rods, 502, at each end thereof, as shown in Fig. 1, whereby it is suitably guided in its vertical movements.

That part of the spinning-mule usually termed the "head" is in this machine embraced almost entirely in that part of the structure shown in front elevation in Figs. 1 and 2 between the standards 2 and 3.

The driving-shaft of the machine 141 is hung in suitable boxes, 140, in two standards, 5, one of which is shown in Figs. 1 and 2, the other being located near the main shaft of the machine 188. Said driving-shaft 141 has thereon a driving-pulley, 136, having a belt-connection with any suitable driving-power from either above or below. The said driving-pulley 136 has a frictional connection with the driving-shaft 141, as and for the purpose below described. The inner end of the driving-shaft 141 has fixed thereon two beveled gears, (not shown in the drawings,) one of which, the one nearest the end of said shaft, engages with a beveled gear, 142, which is fixed on the main shaft 188 of the machine, and the second gear engages with a beveled gear, 137, which is fixed on a sleeve, 113, which rotates on said main shaft. Because of the said geared connection of said driving-shaft with said gears 142 and 137, which are engaged on opposite sides of the driving-shaft, the aforesaid main shaft 188 and the sleeve 113 on said shaft are given rotary motions in reverse directions. The said main shaft 188 is hung in suitable boxes in the standards 2 and 3, as clearly shown in Figs. 2, 7, and 8, the main shaft extending, as shown, unbrokenly between said standards, one end thereof projecting beyond the sides of standard 2 and having fixed thereon a beveled gear, 90, adjoining the shaft-box 91, the box in standard 3 being indicated by 148.

A pulley, 410, is fixed on the hub of a clutch, 409, which is free on said main shaft 188, and said pulley has a belt-connection with a pulley on a counter-shaft, 65, (see Figs. 1, 2, and 6,) said counter-shaft having thereon the pulley 351, which has a connection by the belt 52 with the pulley 352, which is fixed on the drum-shaft 82, on which are carried the drums around which the spindle-bands are carried, said drums being indicated by 84. The above-described connections with the pulley 410 indicate all of the connections between the main shaft and the drum-shaft. A short shaft, 89, (see Fig. 2,) is supported in suitable bearings which are bolted to the side of the standard 2, and on one end of said shaft is fixed a bevel-gear, 88, which engages with said gear 90 on the end of the main shaft 188, and on the opposite end of the shaft 89 is a second bevel-gear which engages with a bevel-gear, 85, having a hub which is keyed to a sleeve, 229, (see Figs. 2, 4, and 28,) which sleeve encircles and rotates on the end of the shaft 11, which is hung in bearings on the standards 2 and 3 parallel to the main shaft. Said sleeve 229 rotates in a bearing, 233, attached to standard 2, and extends in a line with shaft 11 toward the center of the head and has the clutch 230 keyed thereon in the usual way of constructing sliding clutches. The end of said sleeve 229 extends somewhat beyond the face of said clutch 230 and enters the side of a corresponding clutch, 225, which is keyed to the shaft 11.

The object of the above-described connections between the bevel-gear 85, the sleeve 229, and the clutch 230 is to provide such clutch devices on shaft 11 as have a suitable engagement with the hub of the gear 85 as causes them to rotate, and at the same time permits the clutch to have the requisite longitudinal movement on said shaft. The shaft 89 acts to transmit motion from the main shaft 188 to said shaft 11 through said bevel-gear connections.

The above-referred-to vertical movements of the carriage are controlled by the connection of a wire or other suitable rope, 189, (see Figs. 1, 2, and 6,) which runs over a pulley, 503, on the said weight 500, and the ends of said rope are secured to two winding-scrolls, 190 and 205, said scrolls being located on a transverse shaft, 30, scroll 190 being fixed to said shaft and scroll 205 having of itself a free rotation thereon, but having an adjustable connection, as below described, with a hub, 357, which is keyed to said shaft 30 for the purpose of varying the speed of the upward movement of the said carriage, to the end that the said movement may be gradually retarded to a greater or less degree in order to adjust the movement of the carriage to the drawing of the yarn, the latter meanwhile being twisted. The details of the said adjustable connection of the scroll 205 with the hub 357 are shown in Figs. 16 and 17, Fig. 16 showing said scroll and hub in section on a part of said shaft 30 and Fig. 17 showing said shaft in section and a rear side elevation of the scroll and hub, the latter having thereon a flange, 357', as shown, provided with a series of bolts, 205', and bolt-holes, and the scroll is provided with corresponding holes, so that the scroll 205 may be set to different positions relative to the hub in order to cause the end of the rope 189, which is attached thereto, to be wound thereon with a greater or less degree of rapidity, according to the diameter of the scroll on which it winds. The rotary movement of said shaft 30 is controlled by a worm, 27, which is fixed on the shaft 26, which engages with a worm-gear, 354, on said shaft 30, the latter running in suitable bearings in two standards, 28 and 196. (See Figs. 1, 2, and 6.) The said shaft 26 runs in bearings in the standards 6 and 56, and is in front of and parallel with the said main shaft 188 and has thereon a gear, 36, which engages with a gear, 35, which is fixed on the end of the sleeve of a clutch, 25, on the main shaft 188, the latter running freely in said sleeve. The end-thrust of the said shaft 26, on which is the worm 27, is received on the point of a center stud (see Fig. 2) which is fixed on an arm which projects from the upper end of said standard 56.

In order to provide for running the aforesaid spindle-driving drum 84 any given number of revolutions during each draw of the yarn, and in that way providing for giving to it more or less "turns to the inch," as it is sometimes expressed, and so regulating the twist as may be desired, the clutch 409 on the main shaft 188 has an automatically-operating connection with the clutch-shipping rod 34 (see Figs. 2, 5, 6, 7, and 8) by the below-described means, whereby, after the pulley 410, which is secured on the clutch 409, has made a certain number of revolutions, said clutch is disconnected from the keyed clutch 59 and the pulley is stopped, thereby stopping the spindle-drums.

Referring to Fig. 7, a bed-plate, 1, is shown extending horizontally between the standards 2 and 3. Said bed-plate has its ends resting on suitable projections on the opposite sides of said standards.

The above-referred-to clutch-shipping rod 34 is supported in a horizontal position under the main shaft 188 in bearings 122 and 63 on said bed-plate, and one end of said shipping-rod passes through the standard 96, which is secured to the floor. A spiral spring, 95, is placed on said shipper-rod between the said standard 96 and a collar, 64, on said shipping-rod, said spring being so compressed between said collar and standard that it acts to move said rod and the parts connected therewith to the right. (See Fig. 7.)

Referring to Fig. 2, it is seen that the spindle-driving drums are carried on the shafts 83, which are coupled to the shaft 82 within the head of the machine, the said drums being shown in position in the machine in Fig. 3 between the several standards thereof, the drum-shaft extending through said standards and having a bearing in each one thereof, as shown in Fig. 4. The said drums reach from standard to standard, as shown.

The spindles 428 have their steps in wooden rails 261 and 186, which are bolted on one side of the angle-irons 80, which extend longitudinally from standard to standard on either side of the head of the machine and on both sides of the latter and form parts of the frame thereof. The bolster-rails 271 and 182 are in a similar manner bolted to the angle irons 79, located above said angle-irons 80, as shown in Fig. 9, which illustrates in a somewhat enlarged view a portion of the side of one of the intermediate standards, either $2^a$ or $2^b$, looking toward the head of the machine. Said Fig. 9 shows two of the spindles, an end view of the drum, and the bands connecting the latter and the spindles. It will be seen by said figure and Fig. 2 that the spindles are arranged transversely of the machine in inclined positions in two rows, the spindles crossing each other centrally over the axial line of the drum 84. By this arrangement the two rows of spindles are driven by the same drum. By referring to Fig. 4 the positions of the ends of the spindles relative to the said delivery-rolls on the carriage above them is clearly shown, and Fig. 2 shows portions of the said two rows of spindles and the driving-drum on each side of the head of the machine. Two rods, 432 and 434, have their ends supported in a bracket, 430, on said standards $2^c$ to $3^c$, (see Fig. 9,) and extend near the inner sides of the spindle-whirls to keep the spindles in their steps.

In order to describe the construction and action of the parts of the machine which are not embraced in the foregoing description, let it be assumed that the carriage has moved to its highest position, the yarns, as shown in Fig. 1, being drawn between the bobbins on the spindles and the said drawing-rollers on the carriage, the latter being now ready to descend. The positions of the parts of the machine, as shown in Figs. 1, 2, 5, 6, 7, and 8, are those which said parts occupy when the carriage is up, as aforesaid. At this time the main shaft 188 is rotating and carries with it the clutch 59, which is in engagement with the clutch 25, on which gear 35 is keyed, thereby giving rotary movement to the above-described scroll-shaft 30 and turning the scrolls 190 and 205 to unwind the rope 189, letting the weight 500 rise and the carriage move downward by its own weight, and when the carriage so moves it is necessary that the twisted yarn be wound onto the bobbins on the spindles and be properly guided while it is wound on, and the yarn-guiding devices are constructed and operate as follows:

In Figs. 1 and 2 are seen on the front side of the machine two parallel rods, 15 and 16, which have suitable bearings on the aforesaid standards of the machine, there being a pair of said rods on each side of the machine and extending the whole length thereof, said rods being adapted to have a rocking motion, as below described. It is well known to spinners that what are termed "building" and "following" wires, located longitudinally near the ends of the spindles and bobbins, are employed for guiding the yarns onto the bobbins, and in this machine $z$ $z'$ indicate the said wires, (see Fig. 2,) $z$ being the following-wire. The said following-wire $z$ is attached to a suitable number of arms, 347 and 52, (see Figs. 2 and 4,) and said arms are fixed on a rock-shaft, 15, the arms 52 being located at the ends of the groups of spindles and the arms 347 being located intermediately between said end arms and made in form (shown in Fig. 4) to provide for allowing the building-wire, which is attached to the arms 53, to swing backward beyond the ends of the spindles, about as shown in Fig. 4. The said arms 53 are fixed on the rod or rock-shaft 16. The relative position of the yarn and said wires $z$ and $z'$ is that the latter or the building-wire is in front of the yarn and the follower-wire $z$ is back of it, and is held against the yarn by a gentle force sufficient to keep it in contact with the building-wire by several weights, 241, one of which is shown at the left in Fig. 1 and two of which are shown on opposite sides of the machine in Figs. 4 and 6, said weights being suspended from grooved segments 242, as shown in said figures, fixed on said shafts 15. The building-wire is held against the yarn and presses the latter toward the base of the bobbin by several weights, 240, which are hung on grooved segments $242^\times$ on the rod 16. The weights governing the pressure of the building-wire against the yarns are heavier than those which actuate the follower-wire in the opposite direction, so that the movements of the latter wire are under the control of the building-wire, and the successive movements of the rod 16 during the movements of the carriage are actuated by the below-described devices.

While the twist is being given to the yarn, and during the short rest of the carriage in its uppermost position, the positions of the aforesaid arms which sustain the building and following wires are those shown in Fig. 4, whereby the yarn is so held that it slips off the point of the spindle while the latter revolves, and thereby the yarn becomes twisted. Fig. 6 represents the position of the arms which sustain the said wires when the carriage commences to descend and little or no yarn has been built on the bobbins on the spindles, the position of the upper end of said arms when the carriage begins to descend being always at the base of the yarn-cones.

Fig. 31 represents one of the bobbins, and shows thereon a representation of the yarn-cone which is the result of the first winding on when the filling of the bobbin is begun—that is to say, it represents a yarn cone which is the result of more or less winding-on motions, according to the coarseness or fineness of the yarn—and the successive windings on of yarn, the latter being guided by the said building-wire, result in a full bobbin having substantially the form shown in dotted lines in said Fig. 31.

To impart the aforesaid requisite vibratory motion to the building-wire $z$, the following devices are employed:

Referring to Figs. 1, 2, and 6, there is shown in said figures a drive-chain, 37, which runs over a pulley, 363, hung in suitable hangers on the ceiling of the room over the machine, said chain pending in a double position, as shown, and one of the lines thereof is rigidly bolted to one of the angle-irons, 308, of the carriage frame, as shown in Fig. 1, said chain passing around a pulley, 212. (See Fig. 6 and also Fig. 2, wherein said pulley is shown in dotted lines on its shaft 33.) The said shaft 33 is hung in suitable bearings, 213 and 32, which are supported on the bed-plate of the machine, and extends transversely of the machine at right angles to and below the main shaft 188. A gear, 31, is fixed on a shaft, $y$, (see Figs. 14 and 15,) which is adapted to rotate in suitable bearings in the bed-plate 1, by means of a pinion, 339, which is fixed on said shaft 33, (see also Fig. 29,) said shaft $y$ extending in a line with the shaft 33 above it, and having fixed thereon back of the standard 338 (see Fig. 6) a cam, 340, which cam is shown in side elevation in Fig. 47, in dotted lines in Fig. 14, and in edge view in Fig. 15. The cam 340 has imparted to it a reciprocating rotary motion by the downward and upward movement of the carriage through the above-described connection of the carriage with the shaft $y$ by means of the chain 37, the wheel 212, its shaft 33, and the geared connections between the latter and said shaft $y$. Connection is made between the said cam 340 and the above-mentioned rods on which the builder-wire arms are hung, whereby said arms are given the aforesaid vibratory motion by the below-described devices.

A vertical tube, 38, (see Figs. 2, 6, 14, 15, and 47,) is hung on an arm, 42, by a collar-and-nut connection, as shown in Fig. 6, which arm 42 is fixed on a rock-shaft, 47, which extends horizontally of the machine in the head thereof. The said tube 38 is internally screw-threaded, as shown in Fig. 47, and a vertical rod, 106, is located in said tube and has a screw-connection with its interior, the point of said rod reaching below the end of said tube and having a bearing on the periphery of the said cam 340. The purpose of the screw connection between said rod and tube will be described farther on. When the carriage is at the top of the frame of the machine, the cam 340 and the lower end of the rod 106 occupy relatively the positions shown in Fig. 47, and as the carriage descends said cam is rotated in the direction shown by the arrow at the right in said figure, thereby causing the rod 106 and its connected tube 38 to be gradually lifted, thereby rocking the said shaft 47, with which it has a connection, as aforesaid. On said shaft 47, occupying a pending position, as shown in Fig. 6, is an arm, 22, having a connection with the aforesaid rods 16, on which are the building-wire arms, by means of the connecting-rods 24 and 201 and the arms 23 and 200. The vertical motion which is given to the said rod 106 and tube 38 by the said rotary motion of the cam 340 is sufficient only to give to the said building-wires and their arms a vibratory motion equal to the length of the yarn-cone which is to be built onto the bobbin, the said cam being of such form as will produce the required conic form when the yarn is wound on, that form being shown substantially in Fig. 31, in which $w'$ indicates the yarn-cone on the bobbin. The movement of the building-wires in the formation of the cone commences at the base thereof and moves toward the apex of the cone wherever the latter may be in process of formation on the bobbin.

It will be understood that in order to fill a bobbin with yarn by forming thereon, so to say, a series of successive conic formations of wound yarn the building-wires and their arms must have vibratory movements, which commence successively farther and farther from the base of the bobbon with each descent of the carriage while the bobbin is being filled, and the above-described changes in the starting position of the building-wires are produced by the following mechanism:

The extent of the projection of the lower end of the rod 106 below the end of the tube 38 determines the starting position of the arms to which said building-wires are attached when said wires are about to be moved from the base of the yarn-cone upward, and consequently, after doffing and having placed empty bobbins on the spindles, the rod 106 is screwed upward to throw the building-wires to the base of the bobbin or to bring the lower end of said rod to the position relative to the lower end of the tube 38, which is shown in Fig. 15. As the building of the yarn goes on, the said rod 106 is given an intermittent rotary motion by each successive downward movement of the carriage, thereby causing the above-referred-to changes in the starting-points of the building-wire motion.

Figure 10:
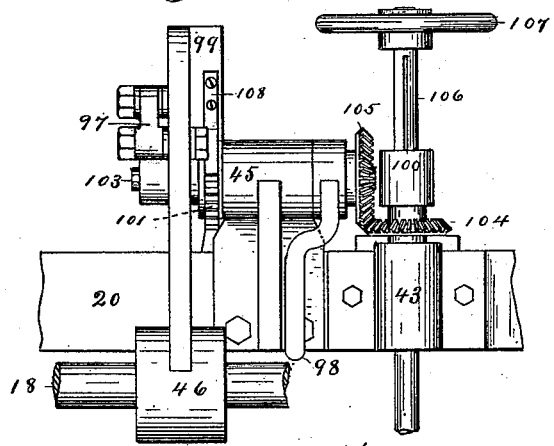
Figure 11:
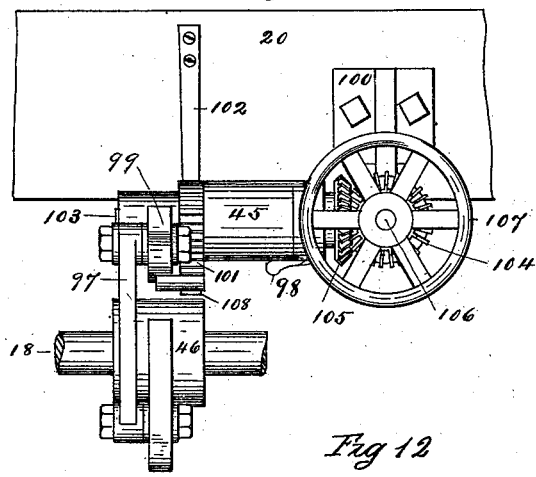
Figure 13:
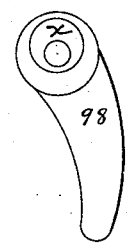
Figure 12:
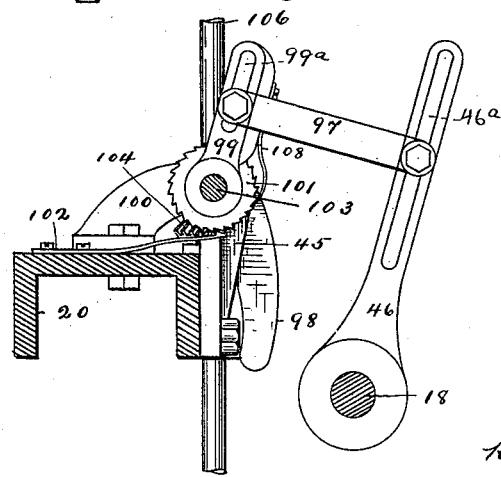

A rock-shaft, 18, is hung in suitable bearings on the standards 2 and 3, (see Figs. 2 and 6,) and on said rock-shaft is fixed an arm, 46, (for details see Figs. 10, 11, 12, and 13,) which arm 46 has an adjustable connection by the bar 97 with a pawl-arm, 99, which has a free vibratory motion on the short shaft 103, which is hung in a bearing, 45, which is secured to the girder 20, which connects the standards 2 and 3. A ratchet-wheel, 101, is fixed on shaft 103 at the side of arm 99, and a spring-pawl, 108, on arm 99 engages with said ratchet-wheel. A ratchet-retaining hook, 102, is secured on the girder 20 and engages with said ratchet-wheel to prevent it from turning backward. The said shaft 103 has on its end a beveled gear, 105, which engages with a bevel-gear, 104, through which the said screwed rod 106 passes, and the latter has a sliding spline-connection with the hub of said bevel-gear 104, the latter having a suitable bearing on said girder 20. As seen in Fig. 12, an arm, 100, is bolted to the top of said girder 20 and has on its end a bearing, as shown in Fig. 10, above the gear 104, whereby the latter is held in position in its bearing. Said bearing 45, which supports the shaft 103, has therein an eccentric sleeve, $x$, (see Fig. 13,) through which said shaft passes, and on said sleeve is an arm or handle, 98, whereby said sleeve is turned to lift shaft 103 and the gear 105 thereon, so as to disengage the latter from the gear 104 on the rod 106, to leave the latter free to be turned by the hand-wheel 107 to bring its lower end nearer the lower end of the tube 38 to adjust the said guide wires to a position, as aforesaid, at the base of the bobbin after doffing and putting new bobbins on the spindles, after which the handle 98 is swung downward, bringing said gears 104 and 105 into re-engagement preparatory to filling a new set of bobbins.

The above-referred-to adjustable connection (by the bar 97) between the arms 46 and 99, having longitudinal slots $46^a$ and $99^a$ therein, as shown, is provided for the purpose of imparting to the shaft 106 a greater or less degree of rotary motion by the action of the arm 46, so that thereby the action of the building-wires over the bobbin may be in accordance with the size of the yarn spun and being wound thereon. The rocking motion is given to the said shaft 18, on which is said arm 46, by the downward movement of the carriage during the latter part of said movement, as follows: Two plungers, 263 and 221, (see Figs. 2, 39, and 40,) have vertical movements in suitable supports in the girder 20— one at each end of the head of the machine. (See Figs. 2 and 5.) Said shaft 18 has fixed thereon two arms, 78 and 179, the ends of which are bifurcated to receive the lower ends of said plungers. Said carriage in moving downward, as above described, causes a projection, $v$ and $s$, on the frame-plates of the carriage which move up and down on the posts 369 and 277 (see Figs. 5 and 6) to come in contact, respectively, with the plungers 263 and 221, thereby forcing them downward against said arms 179 and 78, thereby rocking said shaft 18 to swing the end of arm 46 toward the center of the head and operate the screw-rod 106 to move it downwardly through the tube 38.

During the above-described yarn-building operations the usual "winding-on" operation has proceeded during the down movement of the carriage, whereby the yarn which was spun while the carriage moved upward was placed on the bobbin, the latter being given the requisite rotary motion to effect said winding by the following mechanism: The above-referred-to shaft 11 has fixed thereon a scroll-pulley, 138, (see Figs. 2, 5, and 24,) to which is attached the end of a rope, 172, which passes over a pulley, $a^3$, which is hung in suitable hangers on the ceiling of the room in which the machine is located, and on the pending end of said rope is attached a weight, 294, which is guided in its vertical movements between two vertical guides, 133 and 134. During the ascent of the carriage, the descent of which has just been described, the shaft 11 and the scroll 138 thereon are rotated, and the rope 172, having the weight 294 attached to it, was wound on said scroll, thereby lifting said weight to about the position shown in Fig. 1. The circumstances under which said shaft and scroll are rotated will be hereinafter described. The said shaft 11 has fixed thereon a ratchet-wheel, 144, and adjoining said ratchet-wheel 144 on a suitable support on the standard 3 is hung a pawl, 143, (see Fig. 5,) having a curved arm thereon above its pivot-point, and to the end of said curved arm is pivoted a bar, 178, having secured thereon a catch-block, $a^1$. The end of said bar 178 rests on a lip on the side of an arm, $179^\times$, which is fixed to the aforesaid shaft 18, said lip being the lower edge of a recess in the side of the arm $179^\times$, a spring, $178^\times$, as shown, being attached to the upper side of the bar 178 and having a bearing against the upper side of said recess to hold said bar downward against said lip with a yielding force.

During the aforesaid rotation of the scroll 138 and shaft 11 the pawl 143 rested in engagement with the ratchet-wheel 144, and was there held by a suitable spring, $143^\times$, between it and the adjoining edge of the standard 3. The said pawl remains in engagement with said ratchet-wheel until the aforesaid winding-on operation is ready to take place, at which time the said pawl is disengaged from the ratchet-wheel, as hereinafter described.

A pulley, 282, is placed on the shaft 11, said pulley not being fixed on said shaft, but being made to rotate with it by its engagement with two flat coiled springs, 160, the inner ends of which are secured to two hubs, 159, which are keyed onto said shaft, and their outer ends are hooked onto the ends of a pin passing through one of the arms of said pulley near the rim thereof. (See Figs. 5, 23, and and 24.) The hub of said pulley has on one side thereof and adjoining the junction of one of the arms with the hub two projections, $e^2$, with which two arms, $e^3$, on said hubs 159 engage when the pulley is rotated to a certain extent between said hubs to serve a purpose hereinafter described. The said pulley 282 is connected by a belt, 162, (see Fig. 2,) with a friction-pulley, 283, which is on the drum-shaft 82 in the head of the machine, and is in engagement with said shaft during the winding-on motion. Fig. 23 is a sectional view of the above described pulley 282, the springs 160, and their hubs, and of a portion of shaft 11.

The number of pounds that the weight 294 weighs determines the tension under which the yarn is wound onto the bobbins, because it furnishes the power which turns the drum-shaft and the spindles in winding on through the scroll 138, shaft 11, and the pulley 282; but said scroll regulates that tension and keeps it uniform, because the rope 172 is tangent to the large part of the scroll while the yarn is building upon the base of the cone, and the yarn on the cone and the rope on the scroll move toward the smaller diameters of each simultaneously.

The above-described winding-on action continues until the carriage descends far enough to cause the cam $t$ on one of the carriage-frame plates, 313, (see Fig. 5,) to strike the inclined edge of the long arm of the elbow-lever 187. Said elbow-lever is pivoted to the side of the standard 3, and its short arm extends by the side of the aforesaid bar 178, the latter having a slot in it, as shown, through which a bolt passes and is screwed into the said short arm of the elbow-lever. Consequently, when said cam $t$ engages with the said long arm of the elbow-lever its short arm swings upward, carrying the end of the bar 178 with it far enough to lift the catch-block $a^4$ clear of the said lip on the arm 179, and while the end of bar 178 is in this position the said spring behind the pawl 143 swings the latter into engagement with the ratchet-wheel 144, and thereby stops the winding-on motion.

After the conclusion of the aforesaid winding-on motions, and just before the carriage reaches its lowest position, it actuates the following devices to cause the building-wire arms to swing outward to the positions shown in Fig. 4, where they rest during the next ascent of the carriage.

In Fig. 2, near the inner sides of the standards 2 and 3, are shown the upper ends of two levers, 219 and 256, one of which, 219, is shown in Fig. 6, and the other, 256, is shown in Fig. 5. Said levers have one edge inclined, as shown, and are attached by the other end to a rock-shaft, 204, which is hung in suitable bearings on the girder 20.

When the carriage has descended sufficiently far to cause the cams $r$ and $t'$ on the carriage-frame plates 371 and 313 to strike the ends of said levers, the later are swung laterally, rocking shaft 204 and causing the arm 22, heretofore referred to, to be swung on its pivot through its connection with shaft 204 by the arm 203 thereon and the connecting-bar 21, the said arm 22 being connected with the rods 16, on which the building-wire arms are supported, as heretofore described. In order to retain the said building-wires and their arms in the above-referred-to outward positions (shown in Fig. 4) while the carriage moves upward and the spinning is taking place, the shaft 47 and its connections are retained in the positions to which they are brought by the above-referred-to swinging action of the levers 219 and 256 by retaining the tube 38 and its rod 106 temporarily in the lifted position to which they are brought when the building-wires are moved outward, as aforesaid. Referring to Figs. 14 and 15, it will be seen that the said tube 38 has at its lower end a collar, $f'$, thereon, and in said figures is shown portions of the main shipper-rod 34, (shown in Figs. 7 and 8 under the main shaft 188,) said rod running to one side of the lower end of said tube 38 and having thereon an arm, 341, which is moved by a longitudinal action of said shipper-rod, below described, whereby the end of said arm is brought under the said collar $f'$, when the tube 38 is raised up, as just described, holding said tube and rod in said upward position during the movement of the carriage upward and while the yarns are being spun.

The above-referred-to shipper-rod 34 is given a longitudinal sliding motion to carry the said arm 341 under said collar $f'$ by the downward movement of the plunger 114, the latter being actuated by the arm 164 on the aforesaid rock-shaft 18, said arm striking the upper end of a collar, 279, on said plunger. (See Fig. 5.) The manner in which the rock-shaft 18 is actuated by the descent of the carriage is heretofore fully described. A short shaft, 110, (see Figs. 5, 7, and 8,) is hung transversely between the main shaft 188 and the said shipper-rod 34 in suitable bearings, 109, on standards on the bed-plate of the machine, and on the shaft 110 between said bearings is fixed an elbow-lever consisting of a long arm, 287, and a short arm, 112, each of which arms has a separate hub, as shown in Fig. 5, whereby it is keyed to said shaft and held in proper position. The aforesaid plunger 114 extends through the bed of the machine slightly by the side of the short arm 112 and has a collar, 111, thereon, which acts against said arm and rocks the shaft 110, and thereby the lower end of the long arm 287 of said elbow-lever is carried against a collar, 118, on said shipper-rod, thereby giving it the aforesaid longitudinal motion to the left in Figs. 8 and 7 against the force of the above-referred-to coiled spring 95, which is fully shown in Fig. 2, and said longitudinal movement of the shipper-rod carries the said arm 341 under the collar $f'$ on said tube 38.

For the accomplishment of certain actions of the machine it is requisite that the shipper-rod 34 be retained in the position to which it is moved by the above-described action of the plunger 114, and it is so held by mechanism which is illustrated in detail in Fig. 32. On the bed-plate of the machine is secured a bearing-block, 122, heretofore referred to, through which said shipper-rod passes, the latter having a pin-socket in its side, as shown in Fig. 8, to receive the end of a stop-pin, 399, which is supported partly in said block 122 and partly in a bearing, 250, one end entering said block and being forced against the side of said shipper-rod by a spring, 291, between said bearing 250 and a collar, 400, fixed on said stop-pin. When said shipper-rod 34 is given its said longitudinal motion, the said socket in its side is brought opposite the end of the stop-pin 399 and the latter slides endwise by spring 291, carrying the end of the pin into said socket, and thereby holding the shipper-rod from further movement until by the action of other devices, hereinafter described and partly shown in Fig. 32, said pin is withdrawn. The said longitudinal movement of the shipper-rod 34 by its connection with the sliding clutch 59 (see Figs. 7 and 8) by the arm 406 causes said clutch to move out of engagement with that part of the clutch 25 on which the gear 35 is secured, thereby stopping the rotary movement of said gear and the unwinding movement of the scrolls 190 and 205, heretofore described, coincident with the arrival of the carriage at its lowest point. Following the said disengagement of the clutch 59 from the clutch 25 by the movement of the shipper-rod 34 three clutch engagements are effected simultaneously by the said longitudinal movement of the rod 34, as follows: The sliding clutch 9 on the sleeve 113 is carried into engagement with one end of the clutch 25, thereby again starting the gear 35 to give the winding motion to the scrolls 190 and 205, thereby again elevating the carriage. The same movement of the shipper-rod 34 which causes the said engagement of clutches 9 and 25 effects the engagement of the clutches 59 and 409, the pulley 410 being fixed on the sleeve of the latter, as above described, and through the rotation of said pulley, whose connection with the drum-shaft has been described, the spindles are set in motion.

On the hub of the aforesaid arm 406, (shown in Figs. 7 and 29,) and extending rearwardly from said hub, is a projection, $f^2$, through which a bolt passes into a slot at the end of a lever, 210, said lever being pivoted on the bed-plate 1, and having a vibratory motion in a horizontal plane, and one end of said lever 210 has a pivotal connection with a sliding collar, 208, (see Figs. 29 and 30,) having a hook thereon, as shown, which collar is located on a sliding shipper-rod, 358, which is located under the above-described shaft 11 (see Figs. 6 and 28) and is supported in suitable bearings, 195 and 426. A clutch-arm, 231, (shown in side elevation in Fig. 28 and in section in Fig. 29,) is fixed on said shipper-rod 358, and at the base of said arm 231 is secured a spring-hook, 438, adapted to be engaged with the aforesaid hook on the collar 208. A spiral spring, 206, is placed on the shipper-rod 358 between the bearings 195 and a collar, 207, on said rod. The above-described longitudinal movement of the shipper-rod 34 causes, through the said lever 210, a movement in the opposite direction of the said collar 208, which is connected with the shipper-rod 358 by the above-described hooks, of which 438 is one, and the clutch-arm 231, which is fixed on the rod 358, thereby effecting the endwise movement of the latter and said clutch-arm against the force of said spring 206, which movement carries the clutch 230 (see Fig. 28) into engagement with the clutch 225 on the shaft 11, thereby setting in motion the winding-scroll 138 and carrying upward the above-described weight 294. (See Figs. 1 and 4.)

When the carriage of the machine is raised to the upper end of the frame, as described, it is held in its upward position by the rope 189, which is wound upon the scrolls 190 and 205, as described, and through the connection of the scroll-shaft with the gear 35, as set forth, the latter being on the sleeve of clutch 25, which gear, when the carriage is up, is free from engagement with any of said clutches, the said carriage is held in said position by whatever may be the resistance between the worm-gear on the scroll-shaft and the worm on shaft 26, which has a geared connection with said gear 35; and lest said worm and gear resistance may not be sufficient to hold the carriage up, the gear 35, as shown in Fig. 6, is provided with ratchet-teeth $g'$, and a pawl, 405, (for details see Figs. 48 and 49,) is pivoted on the upper end of a standard, 356, on the bed-plate 1 near the shipper-rod 34. Said pawl has a pending portion, $g^3$, which extends over said shipper-rod and has an engagement with a pin, $g^{31}$, on said rod. A spring, 355, is attached to the standard 356, the free end of which bears against the hooked end of said pawl and swings it against the said ratcheted part of the gear 35, when, by the said movement of the shipper-rod 34 to the left, whereby the carriage is carried upward, the pawl 405 is permitted by the action of spring 355 to swing against the ratchet-teeth in gear 35 and remain there to prevent said gear from turning backward by the weight of the carriage until said shipper-rod is moved in the opposite direction, and then the said pin in the shipper-rod engages with the pending part $g^3$ of the pawl and swings it away from the side of the gear 35.

During the time that the carriage is in its upward position, and while the yarn is receiving its twist, and the shipper-rod 34 having been moved to the left, as described, to cause the carriage to rise, the pins 401 and 415 (see Figs. 7, 8, 32, 36, and 37) have their lower ends resting in slots 401$^\times$ and 415$^\times$ in the upper side of said shipper-rod, the slot in which pin 401 rests being the longer, and said pins are successively disengaged from said rod, as and for the purpose hereinafter described. Said pin 401 is forced downward by a spring thereon, 403, which holds it in said slot, and the pin 415 is forced downward by the action of the above-referred-to upwardly-projecting arm 406, which is fixed on the shipper-rod 34, a laterally-projecting part of said arm being made by the movement of said rod to strike an arm, 61, which is fixed on a shaft, $i^2$, in a standard, 63, (for details see said Figs. 36 and 37,) which is secured to the bed-plate of the machine, as shown. On the said shaft $i^2$, on which said arm 61 is fixed, are fixed two other arms extending in the opposite direction from the latter and numbered 421 and 420, the latter being behind the former one, which is shown in side elevation in Fig. 7. The said arms 420 and 421 extend over the top of said standard 63, and their ends act against the top of a yoke which is connected to said standard and consists of two bolts, 414 and 416, passing vertically through the standard, as shown in Fig. 37, having their opposite ends united by two cross-bars, 419 and 424, the upper one of which cross-bars has secured therein over the shaft 34 the aforesaid pin 415. Said yoke has a free vertical movement in the standard 63, being carried with said pin 415 downward by said arms 420 and 421, and being lifted up by spring 425 (see Fig. 8) when it is free to be moved in that direction, thereby carrying said pin out of the above-referred-to slot 415× in the shipper-rod 34. When the aforesaid yoke, which carries the said pin, moves downward by said arms 420 and 421, it is held down for a certain time by the following-described device: A shaft, 67, rotating in bearings 66 and 418, has, together with the below-described mechanism hung on said shaft, an intermittent reciprocating vertical motion. The said bearings in which is hung the shaft 67 are attached to the ends of two bolts, 413 and 417, which pass through said standard 63 and have attached to their lower ends a yoke-piece, 422. The aforesaid bolts 414 and 416 pass freely through said yoke-piece. A spring, 423, secured under the bed-plate, bears against the under side of the yoke-piece 422 and lifts it up, together with the shaft 67, its bearings, and the parts attached thereto. The said upward movement of the last-named parts is permitted by the withdrawal of an arm on a collar, 64, (see Fig. 8), from above the said yoke-piece 422. The said collar 64 is fixed on the said shipper-rod 34, and when it moves to the left, as in Fig. 8, the said action of the arm on the said collar takes place. The said devices, which are connected with the shaft 67, consist of a collar, 68, having thereon two arms, $o^2$ and $o^3$, which is free on said shaft, a bevel-edged worm-gear, 69, and a grooved pulley, 220, both of which are keyed to said shaft. A spring, 427, one end of which is secured to the hub of the arm 61, (see Figs. 7 and 8,) has its free end bearing upon the end of the arm $o^2$, which adjoins said arm 61, and said spring serves to swing said arm and its collar 68, so as to bring the end of arm $o^2$ over the said yoke, to which the pin 415 is connected, and hold it there until released. When the said shipper-rod 34 occupies a position, as shown in Fig. 8, which does not permit the said pin 415 to enter the slot in said rod, the arm on the collar 64 is in engagement with the yoke-piece 422, thereby holding the shaft 67 and the worm-gear 69 thereon in a downward position, as shown in Fig. 36, so that said worm-gear is separated from the worm 70, which has a coinciding rotary motion with the pulley 410, which drives the spindle-drum, and when the shipper-rod 34 is moved to the left, as above described, the shaft 67 and its connected parts are freed to be thrown upward, as described, bringing the worm-gear 69 into engagement with the worm 70, which worm-gear then has a limited rotary movement according to the amount of twist which it is desired to put into the yarn, and its said limited rotary movement is regulated by pins $o^4$ and $o^5$, placed in holes in said worm-gear, as shown in Fig. 7, one of which pins, $o^5$, as the gear is rotated is brought against the arm $o^3$ on the collar 68, causing the latter and its arm $o^2$ to swing, thus carrying the last-named arm away from over the yoke which holds the pin 415 in engagement with the shipper-rod 34, thereby letting the latter be moved a certain distance to the right by the spring 95, and so stopping the pulley 410, which drives the spindles. The said limited rotary motion of the worm-gear 69 in one direction—that is to say, reversely to that in which the worm 70 turns it—is imparted thereto when said gear and worm are disengaged by the weight 51, which is suspended on the end of a cord (see Figs. 2 and 6) which is attached to said pulley 220 on the shaft 67. The said cord passes over a pulley, 49, on the girder 20, as seen in Fig. 6.

In Fig. 36 the position of the pin $o^4$ is clearly shown in engagement with the said arm $o^3$, as it is after the weight has rotated the gear 69 backward, and the latter is ready for a re-engagement with said worm prior to the next ascent of the carriage.

The rotary motion of the worm-gear 69 by the worm 70, whereby the pin $o^5$ is brought into engagement with the arm $o^3$ on collar 68, takes place while the carriage is moving upward, and at the end of said movement, or when the yarn has received sufficient twist, pin $o^5$ strikes said arm $o^3$ and releases the said yoke, which holds pin 415, thereby disengaging it from the shipper-rod 34 and stopping the spindles, as above described. The said pin $o^5$ is adapted to be placed in any of the several pin-holes shown in the side of the gear 69, in order to allow the latter more or less rotary motion before the spindles are stopped, in order to regulate the twist of the yarn.

As has heretofore been described, when the carriage moves upward the engagement of the ratchet-gears 466 with the racks at each end of the carriage causes the proper operation of the roving spools and delivery-rollers, whereby the rovings are delivered to the spindles. While the twist is being given to the yarn, as aforesaid, the clutches 230 and 225 are in engagement, (see Fig. 28,) causing the shaft 11 and the scroll 138 thereon to be rotated in an opposite direction to that above described when the yarn was being wound onto the bobbins by the downward movement of the weight 294. The engagement of the said clutches serves to cause the scroll-pulley 138 to rotate and again raise said weight to an elevated position. As heretofore stated, the descent of said weight 294 through its connection with the scroll-pulley 138 and the shaft 11 serves to wind the yarn onto the bobbins while the carriage descends. In order to preserve a constant uniform tension on the yarn while the latter is being wound on the bobbin, the below-described devices are provided and cooperate with said weight to effect said result. When the said weight 294 is at its elevated position, the distance of the tangent point of the rope 172 on the scroll pulley 138 from the axial line of the latter bears a constant ratio to the distance of the tangent point of the yarn from the axis of the spindle, and this ratio is maintained during the descent of the carriage while the yarn is being wound onto the bobbin.

The said ratio is kept constant by varying the said tangent point of the rope 172 on the scroll-pulley by winding more or less of said rope thereon.

Referring to Figs. 4, 27, 28, and 29, and for further details to Figs. 18 to 22, inclusive, a shaft, 448, is hung in suitable bearings, 227 and 209, on standards fixed to the bed-plate of the machine. On said shaft is fixed a gear, 211, and a ratchet-wheel, 222, by the side of said gear. On said shaft 448, by the side of said ratchet-wheel, is located an elbow-lever, 224, which is hung loosely on said shaft. The said gear, ratchet-wheel, and elbow-lever, and other parts connected therewith are shown in side elevation in Figs. 18 and 19, each of said figures showing said elbow-lever in different positions. The said ratchet-wheel 222, a segment of which is shown in Fig. 22, has formed therein under the face of each tooth a socket, $222^{\times}$, as shown in dotted lines in said figure and in Fig. 19. The said elbow-lever 224 has one arm extending by the side of the rim of the gear 211, on which rim are two lateral projections, $o^8$ and $o^9$, against each of which the said elbow-lever arm strikes to limit the vibratory motion of said lever on the shaft 448. On the opposite arm of said elbow-lever, and near the end thereof, is pivoted on a bolt, $o^6$, which passes transversely through said arm, a lever, 223, whose outer end projects beyond the periphery of the gear 211 and whose lower end extends toward the shaft 448 and has an engagement with the free end of a spring, 437, which is secured to the side of the first-named arm of said elbow-lever. Said lever 223 has a pin, 449, in its side, which extends into a notch, $224^{\times}$, in the end of the arm of the elbow-lever, on which said lever is pivoted, and limits the vibratory motion of the lever to the length of said notch, Fig. 18 showing said pin at one end of said notch and Fig. 19 showing it at the other. Two pawls, 359 and 361, whose inner ends are halved together, as shown in Fig. 21, (which is a plan view, looking from shaft 448, of the parts which are pivoted on said arm with the lever 223 and a section of the arm,) are likewise pivoted on said arm in the plane of said ratchet-wheel 222, and their outer ends are adapted to engage independently of each other with the teeth of said wheel. The said pawl 361 has a lip, $s^2$, (see Fig. 22,) thereon, which enters said socket in the face of the teeth of the ratchet-wheel in order to prevent the elbow-lever from taking a backward motion. Each of said pawls has a pin in its side, (indicated by 439 and 440,) which pins are adapted to engage with a notch, $223^{\times}$, in the opposite edges of the lever 223, as shown in Fig. 18 and 19. A saddle-spring, $o^7$, (shown in dotted lines in said last-named figures and in plan view in Fig. 21,) is secured by a bolt to the under side of the head of the said bolt $o^6$, and its ends extend laterally over and bear upon the said pins in the sides of the pawls 361 and 359, whereby the ends of the latter are made to engage with said ratchet-wheel. Fig. 20 is a side elevation of one of said pawls.

The operation of the above-described devices in connection with the shaft 11, whereby more or less of said rope is wound on the scroll-pulley 138, is as follows: While shaft 11 rotates to wind the rope on said scroll-pulley, the gear 211 is given a rotary motion by its connection with said shaft by means of the gear 55, Figs. 18, 19, 28, and 29, in the direction indicated by the arrows on Figs. 18 and 19. Fig. 18 shows the position of the parts after the spring 438 has been depressed by the pressure against it of the lever 223, as below described, the rope 172 being tangent to the scroll 138 in the proper position for winding the yarn onto an empty bobbin, as shown in Fig. 25. In this position one arm of the elbow-lever 224 is in contact with the projection $o^8$ on the gear 211.

At the end of each successive winding of the rope on the scroll-pulley, after an empty set of bobbins has been put on the spindles, the tangent point of the rope on the scroll must rise in order to make the tension in winding the yarn correspond to the shape of the newly-forming yarn-cones on the bobbins. This tangent point is made to rise by the pawl 359 and parts attached therewith on lever 224, gaining one tooth on ratchet-wheel 222 in each successive winding of the rope on the scroll until the yarn-cone at the base of the bobbins is wholly formed, at which time one arm of the elbow-lever 224 is in contact with the projection $o^9$ on gear 211 and prevents further movement of the pawl 359 on the ratchet-wheel 222. Each time the scroll is wound after the above contact of said arm and projection, the rope has a tangent point on said scroll, as shown in Fig. 26. Each tooth on the ratchet-wheel 222 which has been occupied by the pawl 359 corresponds to a tangent point on the scroll when the scroll is wound. The number of the teeth acted on by the pawl 359 varies with the size of the yarn spun, as each tooth represents one descent of the carriage.

On Fig. 31 are shown at the base of the bobbin three pending dotted lines numbered, respectively, 1 2 3. On the scroll in Fig. 25 are shown three points, indicated by 1 2 3, at which the rope 172 starts from to wind the first three layers of yarn, 1 2 3, on the bobbin, which are indicated by said figures in Fig. 31. On the ratchet-wheel 222, Fig. 18, are shown opposite three teeth thereon, the figures 1 2 3 which indicate the teeth which the pawl 359 engages with when the winding motion of the scroll is stopped, so as to leave the rope tangent at the points marked 1 2 3 thereon. As the winding continues, the gear 211 and the ratchet-wheel 222 are rotated in the direction above described, and the elbow-lever and parts attached thereto rotate with said gear in consequence of the engagement of the pawl 361 with the ratchet-wheel 222. When in the course of the rotation of said gear the end of the lever 223 comes in contact with the spring 438, the resistance of the latter against the end of said lever causes the lever 223 to swing on its pivot against the action of the spring 437 and to move its notched edge away from under the pin 439, thereby letting the end of the pawl 359 be swung by the end of the saddle-spring onto the point of one of the teeth of said ratchet-wheel. The said spring 438 still continues to press against the outer end of the lever 223 and causes its notched edge to swing against the pin 440 in the pawl 361, thereby lifting the end of said pawl off from the ratchet-wheel against the resistance of said saddle-spring, and therefore the end of the pawl 359 only is engaged with the ratchet-wheel by the movement of the latter since said pawl first dropped onto it, its point being brought to the base of one of the ratchet-teeth. By the above-described alternate engagement of said pawls with the ratchet-wheels the latter and the gear 211 are permitted to advance to the extent of the length of one of the teeth of the ratchet-wheel, for it should be borne in mind that the pawl 359 first struck one of said teeth near its end and the wheel then turned when freed by the pawl 361 to bring the end of the pawl 359 to the base of said tooth. The gear 211 and the said ratchet continuing their rotary motion, the lever 223 is still farther swung on its pivot until the pin 449 on said lever is brought against the end of said notch 224× in the end of the elbow lever, when the lever 223 can swing no more, and its movement against the spring 438 causes the hooked end of the latter to be swung out of engagement with the hook on the collar 208, thereby letting the shaft 358 move endwise, as above described, and carry with it the clutch-arm 231. The said clutch-arm engages, as aforesaid, with the clutch 230, and consequently removes the latter from engagement with clutch 225, and thereby stops shaft 11 and the winding of the rope on the scroll-pulley 138 at the desired point. After the disengagement of said hooks, the spring 206 on the rod 358 moves the latter and said clutch-arm to the position shown in Figs. 28 and 29. When the yarn is wound onto the bobbins, the gear 211 is turned in a contrary direction from that indicated by the arrow at the periphery thereof, and by said backward rotary motion the elbow-lever, owing to the engagement of the pawl 361 with the ratchet-wheel, is carried around with the gear, removing the end of lever 223 from the spring 438.

The above-mentioned action of the gear 211 and elbow-lever 224 relative to the rotary movements of said gear in both directions is entirely automatic; but to leave the rope wound only on the hub of the scroll-pulley 138 when a new set of bobbins is put on the spindles, thereby having said rope wound on a part of the pulley whose diameter corresponds proportionately to that of the barrel of the bobbin when the first winding begins; after putting on said empty bobbins the elbow-lever is turned by the operator to the position shown in Fig. 18, bringing the end of one arm of said lever against the projection $o^8$ on the gear 211, and lever 223 is forced against the spring 438 to disconnect it and to prevent one winding motion of the scroll from taking place at the first ascent of the carriage after doffing. After said adjustment by the operator, the winding and the ratchet movements of said elbow-lever take place automatically, as above described.

As means for stopping the carriage when it reaches its highest point by freeing the shipper-rod 34, so as to let spring 95 move it a certain distance to the right, thereby disengaging the clutch 9 from clutch 25, the vertical rod 132 is located with its lower end in a steady-block, 251, on the bed-plate 1 and extends upward to the top of the frame over the carriage, its upper end having a support in an arm attached to the side of the frame. (See Fig. 41.) Said rod has a collar, 124, thereon near its lower end, with which the long arm of an elbow-lever, 123, engages, the short arm of said lever engaging with a collar, 400, on the stop-pin 399, (see Fig. 32,) heretofore described as engaging with the shipper-rod 34 to hold it in a shipped position. The said rod 132 has a second collar, $s^3$, thereon near its upper end, with which an arm, $s^4$, on one of the frame-plates of the machine (see Fig. 41) engages when the carriage arrives at its highest point, thereby lifting said rod and giving to said elbow-lever 123 such a vibratory motion as serves to draw said pin 399 out of engagement with the shipper-rod 34, letting it slide, as above set forth, until it is stopped by pin 415, as above described, (see Figs. 8 and 37,) and move said clutch 9, thereby stopping the gear 35, which operates the above-described carriage-elevating mechanism.

The above-described sliding movement of the shipper-rod 34 moves the collar 118 thereon against the arm 287 of the heretofore-described elbow-lever, (see Figs. 5 and 8,) thereby causing the rod 114 to be lifted slightly and the shaft 18 to be slightly rocked, together with its attached arms, above described.

After the twisting of the yarn is completed, the spindles are stopped by a further movement of the shipping-rod 34 to the right by the disengagement of the pin 415, as above described, from the said shipper-rod, thus allowing the spring 95 to move said rod until it is again stopped by the pin 401. (See Figs. 8 and 32.) This last movement disengages the clutch 59 from clutch 409, thus stopping the spindles. This last-described sliding movement of the shipper-rod 34 rocks the said shaft 18 still more and carries the end of the arm 179× thereon (see Fig. 5) against the catch-block $a^4$ on the bar 178 to an operative position preparatory to subsequent movements of the parts governing the action of the pawl 143, as heretofore described.

During the above-described action of the machine in spinning the yarn the friction-pulley 283 (see Figs. 2 and 5) on the drum-shaft 82 is disconnected from said shaft. The last-described movement of the shipper-rod 34 causes the connection of the pulley 283 with the drum-shaft in the manner below described, thus stopping the spindle drums and actuating the backing-off motion in the following manner: The drum-shaft 82 and drums are rotating at full speed when the friction-pulley 283 is brought into engagement with said shaft, as below described, and thus the tendency of said pulley is to rotate with said shaft; but it being connected with the heretofore-described pulley 282 by belt 162, the momentum of the drum-shaft causes said pulley 282 to revolve a fraction of a revolution against the force of the coil-springs 160 on each side of said pulley until the said arms $e^3$ on the hubs to which the said springs are connected and the stop projections $e^2$ on the pulley 282 come in contact, when the said pulley and the drum-shaft stop rotating. (See Figs. 23 and 24.) The instant the said pulley and shaft stop, the springs 160 revolve said shaft and pulley in opposite directions, the latter being stopped against the opposite side of said projections $e^2$ from whence the pulley started, as aforesaid. Said backing motion of the drum-shaft by the action of the said springs 160 unwinds a short length of yarn from the spindles prepartory to the said falling down of the building-wires before the descent of the carriage.

On the bed-plate of the machine back of the shipping-rod 34 is a hook-lever, 290, having a U-shaped opening in its free end, its opposite end being pivoted to a block, 289. (See Figs. 34 and 35, the last being in plan view and the former a side elevation.) Said hook-lever extends in front of the lower end of a vertical rocking shipping-rod, 10, having an arm, 288, thereon, whose free end is adapted to swing into and out of the open end of said lever 290 in a horizontal plane. Said arm 288 has thereon an upwardly-projecting pin, 396, which is capable of an endwise motion vertically against the end of a spring, 397, under the arm. A spring, 292, is located under said hook-lever 290 to hold its free end yieldingly upward. On said shipping-rod 34 is fixed a collar, 118, having thereon a horizontal bunter-arm, 395, whose end is adapted to strike the said arm 288 near its end when the rod 34 is moved to the left and turn or rock the said rod 10 correspondingly. On said rocking vertical shipper-rod 10 is fixed an arm, 12, which has a forked engagement with a groove around a sliding cone-shaped collar, 13, on the drum-shaft 82. (See Figs. 2 and 5.)

The relative positions of the arm 288 and hook-lever 290 shown in Figs. 34 and 35 are those which they occupy when the said friction-pulley 283 is connected with the drum-shaft 82, (see Fig. 2,) the sliding conical collar 13 being then forced between the arms of said pulley by the spring 14, as shown in said last-named figure. In Fig. 5 is clearly shown said rod 10 and the shipper-arm 12 thereon, which engages with said sliding cone. As above set forth, the said shipper-rod 34 is moved to the left when the carriage reaches the bottom, and the said movement of the shipper-rod to the left brings the end of said bunter-arm 395 against the arm 288 on rod 10 and carries the end of said arm into the opening in the end of the lever 290 until the pin 396 thereon is depressed and finally is thrown upward behind the hook shown on the upper side of said opening, the bunter-arm 395 resting on the lower side of said opening in the hook-lever and preventing spring 292 from raising said lever and disengaging its hook from the pin 396 in the arm 288. The first movement of the shipper-rod 34 to the right draws said bunter-arm along the lower side of said opening in the lever 290, but does not move it off from the same. The second movement of said rod 34 to the right draws the end of the bunter-arm along on said lever; but it does not clear the end thereof until after the above-described clutches 59 and 409, connected with the main shaft 188, have become disengaged. The moment said bunter-arm clears the end of said lever 290 the spring 292 swings the end of said lever upward, freeing it from the pin 396 on the arm 288, thereby leaving the shipper-rod 10 free and removing all obstacles to the action of the spring 14 on the drum-shaft 82 to slide the conical collar into engagement with the arms of the friction-pulley 283 and connecting it with said drum-shaft, thus effecting the "backing off motion" and the stopping of the drums, as above described.

The above-mentioned friction-pulley 283 is connected with the drum-shaft only during the backing-off motion and the winding of the yarn on the bobbins. It is disconnected from said shaft when the carriage nears the bottom by the aforesaid movement of the shipper-rod 34 to the left, as described.

Reference has heretofore been made to the function of the pin 401 (see Fig. 8) in retaining said shipper-rod 34 in a certain position. Said pin and its operating mechanism are shown in side elevation in Fig. 32. The same mechanism is shown in front view and partly in section in Figs. 7 and 8, respectively. The pin 401 is supported in a bearing-block, 122, fixed to the bed-plate 1, and an arm, 125, reaching over said block. A collar, 402, is fixed on the pin 401, and a spring, 403, between said collar and the arm above it serves to drive the pin downward against the shipper-rod 34, which runs through said block under said pin, and to cause the lower end of the latter to engage in a slot, 401$^x$, in the upper side of said rod. (See Fig. 8.) A short shaft, 398, having its lower end more or less pointed, is hung in a projection on the front side of said block 122, and in the end of said arm 125, and on its upper end, is a grooved pulley, as shown, on which is secured a crown-gear, 127. A cord, 171, has one end attached to said grooved pulley, and is wound around the latter and carried under a guide-pulley, 128, and thence upward over a pulley, 173, on the girder 20, (see Fig. 2,) and has on its pending end a weight, 174. Said shaft 398 has fixed thereon, also, a disk, 131, having a reciprocally-rotating movement, and having a cam projection, $v^3$, on its upper side, which is adapted to engage with the said collar on the pin 401 and lift the latter. Fig. 33 is a plan view of said disk 131, in which is a series of pinholes, in one of which is a pin, $v^4$, which may be placed in either of said holes. The said crown-gear is located under the main shaft 188 and in such position that it may be engaged with a worm, 126, on the sleeve 113 on said shaft. The rotation of the disk 131 by the engagement of said crown-wheel and worm brings the projection $v^3$ under the collar 402 to lift pin 401. The separation of said crown-wheel and worm leaves the shaft 398 and the disk 131 free to be rotated in the opposite direction by the action of said weight 174 until the pin $v^4$ strikes the side of said collar 402, bringing the parts to the position shown in Fig. 32.

The operation of the last-described devices in connection with the shipper-rod 34 and by the second movement of the latter to the right, before described, is as follows: To a collar, 119, on said rod 34 is attached an arm, 120, extending under the lower end of said shaft 398, the upper edge of said arm having an upward projection with a depression each side of it. When the shipper-rod 34 is at its extreme left position, the pin 401 is pressed into a slot, 401$^\times$, in the rod 34, (shown near said pin in Fig. 8,) and the lower end of shaft 398 rests on arm 120 on the depressed part thereof at the right of the said projection thereon. The first movement of rod 34 to the right brings the end of shaft 398 close to the end of said projection. The second movement of said rod brings said projection under the end of shaft 398, thereby raising the latter and its attached parts and engaging the crown-gear 127 and the worm 126, thereby rotating the disk 131 and raising the pin 401. The pin 401 holds the rod 34 in the position it takes after its second movement to the right, and holds it in that position until the pin is withdrawn, as below described. While rod 34 is held by pin 401, as just described, the building-wire arms have the positions shown in Fig. 4. The said cam projection $v^3$ on the disk 131 has its upper edge inclined, as shown, and when it acts under the collar 402 on pin 401 it withdraws the latter gradually from said slot in the shipper-rod 34. After pin 401 has been partly withdrawn from said slot 401$^\times$, so as to be engaged with the offset 401$^a$ at its end, (shown in Fig. 50,) it permits rod 34 to slide slightly to the right and far enough to draw the end of arm 341 (see Fig. 14) from under the collar $f'$ on the tube 38, whereby the latter is let drop, so that the point of rod 106 strikes the edge of the cam 340. This downward movement of rods 38 and 106 rocks the shaft 47, (see Fig. 6,) and consequently swings the building-wire arms so that the wires are brought to their proper position at the base of the yarn-cones ready for the descent of the carriage. The withdrawing of the pin 401 from said slot in rod 34 continues, and when fully withdrawn the rod 34 is by the spring 95 thereon given its final movement to the right, which movement still further lifts the rod 114, thereby rocking the shaft 18 and its said attached parts, and causing the bar 178 to be pushed endwise and the pawl 143 disengaged from the ratchet-wheel 144, thus leaving the weight 294 free to act, as aforesaid, on the spindle-drums to wind the yarn on the bobbins while the carriage descends. Furthermore, said final movement of the rod 34 engages the clutches 59 and 25 on the main shaft 188 and permits the unwinding of the scrolls 190 and 205, Fig. 6, thus allowing the carriage to descend.

The foregoing description of the operation of the mule-spinner herein shown and described embraces the action of the various parts thereof while the carriage descends and rises again to the top of the machine and is brought to the position from whence it started.

On each side of the machine and running from end to end thereof is hung a shipper-rod, 19. (See Figs. 1, 5, and 38.) A vibratory lever, 170, is pivoted under the said girder 20 and has its ends engaging between collars 169 and 168 on each of said rods 19. Said lever 170 extends across the above-referred-to shaft 18 and has a pivotal connection with a sliding clutch, 167, which is keyed on said shaft and slides thereon. A clutch, 166, having an arm thereon in which shaft 18 rocks freely, is hung on said shaft, and the end of said arm is curved and extends laterally at the side of the machine and has a bar, 115, pivotally connected thereto and with an arm, 117, at the bed-plate, which is fixed on a rock-shaft, 121. A forked arm, 139, fixed on said shaft 121, engages with a cone-shaped sliding collar, 286, splined to the above-referred-to driving-shaft of the machine. (See Figs. 2, 4, and 5.) As above described, a friction driving-pulley, 136, of ordinary construction, is hung on the shaft 14, having lever-arms 136$^\times$, as shown, hung therein and projecting laterally therefrom and bearing on said conical collar 286. The movement of said collar against said arms causes the shaft on which the pulley is hung to rotate with the pulley, and the movement of the said collar in the opposite direction frees the pulley from the shaft, so that the shaft no longer rotates. The friction-pulley heretofore referred to on the drum-shaft 82 is of like construction. The said forked arm 139 is fixed on a rock-shaft, 121, at the base of the machine, and an arm, 150, fixed on said shaft, has a spring, 151, connected to its end, which serves to engage the collar 286 with the driving-pulley when the said clutches 166 and 167 are disengaged. Either of the said shipper-rods 19 is in a convenient position to be grasped at any point on either side of the machine to engage said clutches 167 and 166, in order that the carriage may be stopped at its lowest point when in moving, it strikes the said plungers 263 and 221 and thereby rocks shaft 18, and through the latter causes the friction-collar of said driving-pulley to be moved therefrom and the action of the machine to be stopped. To provide for operating the said conical friction-collar 286 on the driving-shaft 141, in order to stop the machine at any moment and then to start it, if desired, a hand shipper-rod, 180, (see Figs. 2 and 5,) has its lower end secured in a collar on said shaft 121 adjoining the collar 139, to which is attached the aforesaid forked arm, which engages with said friction-collar. The said collar, to which the shipper-rod 180 is connected, has a lip attachment or connection with the end of said collar 139, so that when the shipper-rod 180 is moved from the position shown in Fig. 5 (where the end of it is shown broken off) toward the side of the machine, the arm 139 has a similar motion and draws the collar 286 away from the arms of the friction-pulley, thereby causing the machine to be stopped.

An arm, 147, is bolted to the side of the machine and extends laterally by the side of the shipper-lever 180, and has a notch in its edge, as shown, with which said lever engages when swung up to stop the machine. When the shipper-lever is disengaged from said notch in the arm 147, the aforesaid spring 151 serves to throw the friction-collar 286 again in engagement with the arms of the friction-pulley and start the machine.

What I claim as my invention is—

1. The combination, with an upright frame, a carriage provided with a series of roving-drums and roving-delivery rollers, and means for vertically reciprocating said carriage on said frame, of a vertical rack secured to said frame and extending over a portion of the travel of said carriage, a shaft mounted on said carriage and having geared connection with said roving-drums and roving-delivery rollers, a pinion mounted on said shaft and engaging with said rack, and a pawl-and-ratchet connection between said shaft and said pinion, all constructed, arranged, and operating substantially as shown and described.

2. The combination, with an upright frame, a carriage provided with a series of roving-drums and roving-delivery rollers, and means for vertically reciprocating said carriage on said frame, of a vertical rack, means for adjusting said rack vertically on said frame over a portion of the travel of said carriage, a shaft mounted on said carriage and having geared connection with said roving-drums and roving-delivery rollers, a pinion mounted on said shaft and engaging with said vertical rack, and a pawl-and-ratchet connection between said shaft and said pinion, all constructed, arranged, and operating substantially as shown and described.

3. The combination, with a carriage of a spinning-mule capable of a vertical reciprocating movement, a counter-weight, guide-pulleys mounted in the main frame, ropes connecting said carriage and counter-weight and passing over said guide-pulleys, a shaft, winding-scrolls secured to said shaft, rope-connection between said counter-weight and said scrolls, a clutch loosely mounted, and intermediate gearing connecting said clutch and winding-scroll shaft, of a plunger, a shipper-rod, intermediate mechanism connecting the shipper-rod and plunger, a driving-shaft, a clutch, intermediate mechanism connecting said clutch with said driving-shaft, an arm secured to the shipper-rod and engaging with one of said clutches, and a projection secured to said carriage adapted to engage with said plunger and through the intermediate mechanism to operate the shipper-rod, and the arm secured thereto to throw the clutches into engagement and wind the scrolls to raise the carriage, all constructed, arranged, and operating substantially as shown and described.

4. The combination, with a carriage of a spinning-mule capable of a vertical reciprocating movement, a counter-weight, guide-pulleys mounted in the main frame, ropes connecting said carriage and counter-weight and passing over said guide-pulleys, a shaft, winding-scrolls secured to said shaft, rope-connection between said counter-weight and said scrolls, a clutch loosely mounted, intermediate gearing connecting said clutch and winding-scroll shaft, a clutch, and intermediate mechanism connecting said clutch with the driving-shaft and engaging the said loosely-mounted clutch, of a shipper-rod, a spring engaging with said shipper-rod, an arm secured to said shipper-rod and engaging with one of said clutches, a locking device holding said shipper-rod against the tension of said spring, and a rod connected with said locking device and provided with a projection adapted to be engaged by the reciprocating carriage to release the locking device and allow the shipper-rod to disengage the clutches when the carriage reaches the end of its travel, all constructed, arranged, and operating substantially as shown and described.

5. The combination, with a vertically-reciprocating carriage, a winding-scroll shaft mounted in the main frame and provided with winding-scrolls, rope-connection between said winding-scrolls and reciprocating carriage, a ratchet-wheel, and intermediate mechanism connecting said ratchet-wheel with the winding-scroll shaft, of a pawl engaging with said ratchet-wheel and holding said carriage elevated, and a shipper-rod provided with a projection adapted to engage said pawl, release the ratchet-wheel and winding-scroll shaft, and allow the carriage winding mechanism to operate, all constructed, arranged, and operating substantially as shown and described.

6. The combination, with a reciprocating carriage, winding-scrolls secured to a shaft suitably mounted in the main frame, rope-connection between said carriage and winding-scrolls, a clutch loosely mounted, intermediate gearing connecting said clutch and winding-scroll shaft, a driving-shaft, a clutch, intermediate mechanism connecting said clutch with said driving-shaft, a shipper-rod, and mechanism connecting said shipper-rod with one of said clutches, of a spring engaging with said shipper-rod, a locking device holding said shipper-rod against the tension of said spring, a cam, and intermediate gearing connecting said cam with the driving-shaft, whereby as the cam is rotated it will engage with and release the locking device, allow the spring to actuate the shipper-rod to throw the clutches into engagement, and operate the winding-scrolls to permit the carriage to descend, all constructed, arranged, and operating substantially as shown and described.

7. The combination, with a series of spindles, a shaft mounted in the main frame, a spinning-drum secured to said shaft, bands connecting said spindles with said spinning-drum, a pulley secured to said spinning-drum shaft, a main shaft, a pulley mounted loosely on said main shaft, belt-connections from said loose pulley to said spinning-drum-shaft pulley, and a clutch loosely mounted on the main shaft and secured to said loose pulley, of a clutch splined to said main shaft, a shipper-rod, mechanism connecting said shipper-rod and splined clutch, a vertical plunger, intermediate mechanism connecting said plunger and shipper-rod, a carriage carrying roving-drums and roving-delivery rollers, means for vertically reciprocating said carriage, and a projection secured to said carriage and adapted to engage with the plunger and through the intermediate mechanism to operate the shipper-rod and throw the splined clutch connected therewith into engagement with the loose clutch, and thereby start the spinning, all constructed, arranged, and operating substantially as shown and described.

8. The combination, with a main shaft, a clutch splined to said main shaft, a shipper-rod, mechanism connecting said splined clutch and shipper-rod, a spring acting against a collar on the shipper-rod, a locking device holding said shipper-rod against the tension of the spring, a retainer holding said locking device in engagement with the shipper-rod and provided with a projecting arm, and a releasing-spring engaging with said locking device, of a clutch mounted loosely on the main shaft and engaging with the splined clutch, a pulley secured to said loose clutch, a spinning-drum, intermediate mechanism connecting said pulley with the spinning-drum, and a disk having geared connection with said pulley and provided with a stop adapted to engage with the projecting arm of the retainer to release said retainer, allow the releasing-spring to disengage the locking device, and the shipper-rod spring to operate the shipper-rod, all constructed, arranged, and operating substantially as shown and described.

9. The combination, with a main shaft, a clutch splined to said main shaft, a shipper-rod, and mechanism connecting said splined clutch and shipper-rod, a spring acting against a collar on the shipper-rod, a locking device holding said shipper-rod against the tension of the spring, a retainer holding said locking device in engagement with the shipper-rod and provided with a projecting arm, and a releasing-spring engaging with said locking device, of a clutch loosely mounted on the main shaft and engaging with the splined clutch, a pulley secured to said loose clutch, a spinning-drum, intermediate mechanism connecting said pulley with the spinning-drum, a disk having geared connection with said pulley, and a stop adjustably secured to said disk and adapted to engage with the projecting arm of the retainer to release said retainer, allow the releasing-spring to disengage the locking device, and the shipper-rod spring to operate the shipper-rod, all constructed, arranged, and operating substantially as shown and described.

10. The combination, with a shipper-rod, a spring engaging with the shipper-rod, a locking device holding said shipper-rod against the tension of said spring, a retainer holding said locking device in engagement with the shipper-rod and provided with a projecting arm, a spinning-drum shaft, and a disk having intermediate geared connection with said spinning-drum shaft and provided with a stop adapted to engage with the projecting arm of the retainer to release the locking device, of a pulley loosely mounted, a spring fixed at one end and having its other end secured to said loose pulley, a pulley loosely mounted on the spinning-drum shaft, band-connection between said pulleys, a clutch adapted to connect said spinning-drum-shaft pulley with said shaft, a spring engaging with said clutch, and intermediate mechanism connecting said clutch with the shipper-rod and holding said clutch out of engagement against the tension of said spring, all constructed, arranged, and operating substantially as shown and described, whereby when the shipper-rod is released the spring-actuated clutch connects the loose pulley with the spinning-drum shaft and effects the backing off.

11. The combination, with a winding-weight, a shaft mounted in the main frame, a scroll secured to said shaft, a rope connecting said scroll and weight, intermediate mechanism connecting said shaft with the spinning-drum shaft, a ratchet-wheel secured to the winding-scroll shaft, a pawl engaging with said ratchet, a shipper-rod, and intermediate mechanism connecting said pawl and shipper-rod to disengage said pawl by the movement of said shipper-rod, of a spring engaging with said shipper-rod, a locking device holding said shipper-rod against the tension of said spring, a cam, a driving-shaft, and intermediate gearing connecting said cam with said driving-shaft, whereby as the cam is rotated it will engage with and release the locking device, allow the spring to actuate the shipper-rod to withdraw the pawl, and permit the winding-weight to operate, all constructed, arranged, and operating substantially as shown and described.

12. The combination, with a shaft mounted in the main frame, a winding-weight, mechanism connecting said shaft and winding-weight, a spinning-drum, intermediate driving mechanism connecting said shaft with the spinning-drum, and a ratchet-wheel secured to said winding-shaft, of a pawl adapted to engage with and lock said ratchet-wheel, mechanism for holding said pawl disengaged, a lever connected with and controlling said mechanism, a carriage provided with roving-drums and roving-delivery rollers, means for reciprocating said carriage, and a projection secured to said carriage adapted to engage on the descent of the carriage with said lever, release the mechanism for holding the pawl disengaged, and permit said pawl to engage with and lock said ratchet-wheel, all constructed, arranged, and operating substantially as shown and described.

13. The combination, with a scroll mounted in the main frame, a winding-weight, a rope connecting said winding weight and scroll, and a clutch connecting with said scroll, of a clutch engaging with said scroll-clutch, a main shaft, intermediate mechanism connecting said clutch with the main shaft, a shipper-rod, mechanism connecting the shipper-rod with one of said clutches, a spring engaging with the shipper-rod, a locking device holding said shipper-rod against the tension of said spring, a pivoted projecting arm, and mechanism connecting said arm and winding-scroll to effect the rotation of the arm, said arm being adapted to disengage the locking device to allow the spring to operate the shipper-rod and disengage the clutches, all constructed, arranged, and operating substantially as shown and described, whereby when the winding-weight has reached the proper height the scroll will stop winding.

14. The combination, with a scroll mounted in the main frame, a winding-weight, a rope connecting said winding weight and scroll, and a clutch connected with said scroll, of a clutch engaging with said scroll-clutch, a shipper-rod, intermediate mechanism connecting said clutch with the main shaft, mechanism connecting the shipper-rod with one of said clutches, a spring engaging with the shipper-rod, a locking device holding said shipper-rod against the tension of said spring, a wheel, mechanism connecting said wheel with said scroll, a projecting arm adapted to disengage said locking device to allow the spring to operate the shipper-rod and disengage the clutches, and an escapement-gear connecting said arm with said wheel, all constructed, arranged, and operating substantially as shown and described, whereby at each operation the winding-scrolls are disengaged and the relative position of the projecting arm and the wheel is changed.

15. The combination, with a scroll mounted in the main frame, a winding-weight, a rope connecting said winding weight and scroll, and a clutch connected with said scroll, of a clutch, a main shaft, intermediate mechanism connecting said clutch with the main shaft and engaging with said scroll-clutch, a shipper-rod, mechanism connecting the shipper-rod with one of said clutches, a spring engaging with the shipper-rod, a spring-actuated locking device holding said shipper-rod against the tension of said spring, a wheel, intermediate mechanism connecting said wheel with said winding-scroll, a ratchet-wheel secured to said wheel, an arm centrally pivoted with said wheel, a lever pivoted at the outer end of said arm and having a limited vibratory motion thereon and adapted to disengage said spring-actuated locking device and allow the shipper-rod to operate to disengage the clutches, a spring of less resistance than the locking-device spring secured to the arm and engaging with the vibratory lever, and two pawls pivoted to the arm and engaging with the ratchet-wheel and provided with projections adapted to be engaged by projections on the vibratory lever, all constructed, arranged, and operating substantially as shown and described, whereby at each operation the winding scrolls are disengaged and the relative position of the arm and wheel is changed, for the purpose specified.

16. The combination, with a carriage carrying roving-drums and roving-delivery rollers, means for reciprocating said carriage, a shaft mounted in the main frame, a cam secured to said shaft, and intermediate mechanism connecting said reciprocating carriage and said shaft to effect the rotation of the shaft by the movement of the carriage, of a rock-shaft mounted in the main frame, having arms secured thereto carrying on their outer ends a building-wire, a rod engaging with the cam, and intermediate mechanism connecting the building-arm rock-shaft with said rod, all constructed, arranged, and operating substantially as shown and described, whereby as the cam is rotated the rock-shaft carrying the building arms and wire is rocked.

17. The combination, with a carriage, means for reciprocating said carriage, a shaft mounted on the main frame, a cam secured to said shaft, mechanism connecting said shaft and carriage to effect the rotation of said shaft by the movement of the carriage, a rock-shaft having arms secured thereto carrying at their outer ends a building-wire, a rod formed in two sections united by screw-threads and engaging with said cam, and mechanism connecting said rod and the building-arm rock-shaft, of a plunger mounted in the main frame, mechanism, including a pawl and ratchet, connecting said plunger and one section of the cam-rod, and a projection secured to the reciprocating carriage, adapted to engage with said plunger and through the intermediate pawl-and-ratchet connection to partially rotate one section of the cam-rod, thereby lengthening the same, all constructed, arranged, and operating substantially as shown and described.

18. The combination of a carriage carrying roving-drums and roving-delivery rollers, means for reciprocating said carriage, a shaft mounted on the main frame, a cam secured to said shaft, mechanism connecting said carriage and said shaft to effect the rotation of the shaft by the movement of the carriage, a rock-shaft having arms secured thereto carrying a building-wire, a rod formed in two sections having a screw threaded connection with each other, one section of said rod engaging with the cam, mechanism connecting the other section of said rod with the building-arm rock-shaft, a ratchet-wheel, mechanism connecting said ratchet-wheel with one section of said rod, a pawl engaging with said ratchet-wheel, a plunger mounted on the main frame, a projection secured to the reciprocating carriage and adapted to engage with and operate the plunger, and means for adjusting the connection between said pawl and said plunger to regulate the throw of said pawl and amount of rotation of the ratchet-wheel, and the consequent lengthening of the connection between the cam and the building-arm rock-shaft, all constructed, arranged, and operating substantially as shown and described, as and for the purpose specified.

19. The combination, with a rock-shaft provided with arms carrying on their outer ends a building-wire, of a pivoted lever, intermediate mechanism connecting said lever with said rock-shaft, a carriage carrying roving-drums and roving-delivery rollers, means for reciprocating said carriage, and a projection secured to said carriage, adapted to engage with and operate said lever, and through said intermediate mechanism to rock said rock-shaft and its arms to carry the building-wire to a position for spinning, all constructed, arranged, and operating substantially as shown and described.

20. The carriage consisting of several pairs of plates, substantially as described, certain of which have thereon the arms $g$, and longitudinal angle-irons 308 and 324, secured to the opposite edges of said plates, substantially as set forth.

21. The carriage consisting of several pairs of plates, substantially as described, having laterally-projecting webs formed on their inner opposite sides, guide-rolls, substantially as described, hung to rotate between said plates, having an engagement with the edges of the post of the frame of the machine which extends between said plates, and longitudinal angle-irons 308 and 324, secured to the opposite edges of said plates, substantially as set forth.

22. The carriage having a series of ropes attached thereto, substantially as described, the frame of the machine having rollers journaled therein, over which said ropes pass, and a counter balancing-weight, 500, hung on said ropes, of less weight than the carriage, and capable of a vertical movement in the frame of the machine coinciding inversely with the movements of the carriage, combined with two winding scrolls, as 190 and 205, adjunctive mechanism, as described, for actuating the scrolls, and a rope having its ends attached to said scrolls and passing over and engaging with said counter-balancing weight, substantially as set forth.

23. The combination of the machine-frame, ropes 449, and pulleys $w$, the counterbalancing-weight 500, and the carriage to which it is suspended, a winding-scroll, 190, and a like scroll, 205, a shaft to which both scrolls are attached, and a rope having its ends attached to said scrolls passing over and engaging with said weight, a clamp-connection on said scroll-shaft, whereby said scroll 205 is capable of adjustment on its shaft to cause the end of the said rope which is attached thereto to be wound onto the higher or lower parts of the scroll, substantially as set forth.

24. The main shaft 188 of the machine, having a driving-gear, 142, fixed thereon, and a loose sleeve, 113, on said shaft, having a driving-gear, 137, fixed thereon, combined with a driving-shaft, as 141, having a geared engagement, substantially as described, with said gears 137 and 142, and a driving-pulley thereon having a frictional engagement with said shaft, substantially as set forth.

25. The spindle-driving shaft 82, the pulley 410, the main shaft 188, adjunctive mechanism, as described, connecting shafts 82 and 188, the shipper-rod 34, having the arm 406 thereon and a slot therein, a clutch, 59, actuated by arm 406, and the collar 64, having an arm extending under said rod, combined with a yoke, a pin, 415, supported on the yoke, as described, and capable of a movement toward and from said rod, a shaft, $i^2$, having a rocking arm, 61, with which said arm 406 engages, means for moving arm 406 and rod 34 toward shaft $i^2$, and the spring 95, for moving them oppositely, two rocking arms, as 420 and 421, engaging with said yoke to move said pin against said rod, a spring, 425, to move said yoke and pin upward, a yoke-piece, 422, a shaft, 67, hung in bearings attached to said yoke piece under the bed of the machine, a spring, 423, to lift said yoke-piece and shaft 67, a collar, 68, on shaft 67, having two arms, as $o^2$ and $o^3$, thereon, a worm-gear, 69, fast on said shaft 67, having pin-holes in its side, a pin, $o^4$, fixed in said gear, and a pin, $o^5$, adapted to be placed in any of said holes, a pulley, as 220, fixed on shaft 67, having a cord attached thereto, a weight, as 51, hung on said cord, a clutch, 409, loose on shaft 188 and to which clutch the pulley 410 is attached, and the worm 70 on clutch 409 on the main shaft 188, said clutch being loose on said shaft, substantially as set forth.

26. Cop-building mechanism consisting of two parallel rods, 15 and 16, capable of a rocking motion in suitable bearings on opposite sides of the machine and having wire-supporting arms thereon, and suitable weights attached to said rods, substantially as described, to swing said arms and wires toward the yarns, combined with a cam, as 340, a carriage, adjunctive mechanism, as described, for imparting rotary motion imparted to the cam by the downward motion of the carriage, substantially as described, a tube, 38, the rod 106, engaging the tube and resting on said cam, and a rock-shaft, 47, having an arm thereon connected pivotally with said tube and a second arm thereon, and means for connecting said second arm with each of said shafts 16, substantially as set forth.

27. The shaft 11, the main shaft 188, having a connection with shaft 11, as described, a scroll-pulley, 138, fixed on shaft 11, a weight, 294, and a cord, 172, connecting the scroll and weight, the drum shaft 82, having a connection, as described, with said shaft 11, the ratchet-wheel 144, fixed on the last-named shaft, and a pawl, 143, having a bar, 178, pivotally connected therewith, having a catch-block, $a^4$, thereon, combined with the rock-shaft 18, having an arm, $179^\times$, thereon, with which said bar engages, and means for actuating said shaft 18, substantially as set forth.

28. The carriage having on one of its frame-plates the projecting cam $t$, the spring-actuated pawl 143, the spring $143^\times$, for engaging said pawl, the bar 178, and the elbow-lever 187, capable of engagement with said cam and having one arm engaged with said bar, combined with the shaft 11 and the ratchet-wheel 144 on said shaft, means for reciprocating the carriage, means, as described, to actuate shaft 11, and means, as described, to hold the bar 178 and the pawl against the force of the spring, substantially as set forth.

29. In combination, the rock shaft 47, the rock-shaft 204, having a connection with said shaft 47—namely, the bar 21, as described—and the levers 219 and 256, attached to said shaft 204, the reciprocating mechanism of the carriage, as described, the carriage having the cams $r$ and $t'$ on the frame-plates thereof, as described, capable of engagement with said levers, the arm 22, and the rods 16, having the building-wire arms thereon and having a connection, as described, with said arm 22 on said rock-shaft 47, substantially as set forth.

30. The tube 38, having a collar, $f'$, thereon, the shipper-rod 34, a collar, 118, and an arm, 341, thereon capable of engagement with said collar $f'$, the plunger 114, the shaft 18, and an arm, 164, thereon engaging the plunger, combined with an elbow-lever, 287, having an engagement with a collar on said plunger and shipper-rod, means for elevating tube 38, and means for actuating shaft 18.

31. The lever 210, pivoted on the bed-plate 1 and having a vibratory motion in a horizontal plane, the shipper-rod 34, having a pivotal connection, as described, with one end of said lever, the longitudinal shipper-rod 358, having the spring 206 thereon, the collar 208, having a free longitudinal movement on said rod 358 and a pivotal connection with one end of the lever 210, and having a fixed hook thereon, as described, a clutch-arm, 231, fixed on said rod 358, having a hook thereon to engage with the hook on said collar, and means, as described, for releasing the hooks, combined with the shaft 11, having the winding-scroll 138 and clutch 225 fast thereon, and a clutch, 230, with which said arm 231 engages, and means, as described, for rotating said clutch 230, substantially as set forth.

32. The shipper-rod 358, having the spring 206 and provided with the collar 208, having a hook thereon, and the clutch-arm 231, having a spring-hook, 438, on its collar adapted to engage the hook on collar 208, combined with the gear 211, having lateral projections on its rim, mechanism for rotating said gear alternately in opposite directions, a ratchet-wheel, 222, a shaft, 448, on which said gear and ratchet are mounted side by side, an elbow-lever, 224, hung to rotate freely on said shaft, a lever, 223, pivotally connected to one arm of said lever and having a limited vibratory movement capable of engaging with said spring-hook, and two independently-acting pawls carried on said elbow-lever to engage with said ratchet and the lever 223, a saddle-spring engaging with pins on said pawls, a spring attached to said elbow-lever and acting against one end of said lever 223, and mechanism for moving rod 358 against the tension of spring 206, substantially as set forth.

33. The shipper-rod 34, a spring, as described, to move said rod longitudinally, the drum-shaft 82, having the wheel 161, the spring 14, and the friction-collar 13 thereon, a collar on said rod 34, having a bunter-arm, 395, thereon, a slotted hook-lever, 290, pivoted on the bed-plate by the side of the rod 34, having its open end opposite the end of said bunter-arm, a vertical rocking shipper-rod, 10, having an arm, 288, thereon capable of vibratory motion in a horizontal plane, a spring-actuated pin, carried by arm 28, capable of engagement with the hook in said lever 290, a spring, 292, to hold the free end of said hook-lever upward, and a clutch-arm, 12, on said rod 10, engaging with the friction-collar 13 on said drum-shaft, combined and operating substantially as set forth.

34. In combination, the shipper-rod 10, the arm 288 thereon, having the pin 396 bearing on the end of a spring under said arm, the pivoted hook-lever 290, having its end slotted to receive said arm and having a hook therein to engage said pin, and mechanism for moving arm 288 from said hook when disengaged, combined with the shipper-rod 34, having the bunter-arm 395 attached thereto, and a spring to hold the free end of said lever upward, substantially as set forth.

35. The shipper-rod 34, having a slot therein provided with an offset at one end thereof, as described, and carrying the horizontal arm 120, a spring for moving said rod longitudinally, the spring-actuated pin 401, engaging with said slot and having a collar, 402, thereon, a shaft, 398, whose lower end is capable of engagement with said arm, having a rotary motion parallel with said pin and having a disk thereon provided with a cam projection to engage said collar and lift said pin, and with a stop-pin, $v^4$, therein, said shaft having also a pulley thereon having a cord attached thereto and carrying a crown-gear, 127, and a spring, 404, to force said shaft downward, combined with the sleeve 113, the worm 126, carried thereon, and a weight attached to said cord, substantially as set forth.

36. The shipper-rod 34, a spring for moving it longitudinally, said rod having a slot therein with one end offset, as described, and having the arm 341 thereon, combined with the tube 38, having a collar thereon to engage with said arm, mechanism for elevating tube 38, the shaft 47, and the rods 16, connected with said tube, lever-connections, substantially as described, between said shaft 47 and the tube 38 and rods 16, the pin 401, engaging in said slot, having the collar 402, and the shaft 398, carrying the rotating disk 131, having a cam projection thereon to engage with and gradually lift said pin, and means, substantially as described, for imparting a rotary motion to said disk, combined and operating substantially as set forth.

37. The shaft 18, having the sliding clutch 167 thereon, mechanism for operating shaft 18 and the arm 166, extending from a loose clutch-sleeve on said shaft, the horizontal shipper-rods 19, having collars 168 and 169 thereon, a lever, 170, pivoted centrally on the machine and having engagement with said rods and with said clutch 167, a driving-shaft, 141, an elbow-lever pivoted under the driving-shaft 141, and a driving-wheel, a sliding friction-collar, 286, also engaging said shaft, a suitable connection, as described, between said arm 166 and said elbow-lever, and a spring, as 151, to swing the latter, combined and operating substantially as set forth.

38. The drum-shaft 82, the weight 294, and an intermediate shaft, as 11, means, as described, for imparting thereto a rotary motion by said weight, and a connection, as described, with said drum-shaft and the spindle-driving bands, whereby its said rotary motion is communicated to the last-named shaft and the spindles while the carriage descends, combined and operating substantially as set forth.

39. The shaft 11, having a sleeve, 229, thereon, a clutch, 230, splined and sliding on said sleeve, a gear, 85, a clutch, 225, fast on shaft 11, and the main shaft 188, having a geared connection with said last-named gear, and mechanism for shifting clutch 229, combined and operating substantially as set forth.

40. The main shaft 188, the clutch 25, having a free rotary motion thereon and having a gear, 35, fixed thereto, the sleeve 113, having a free rotary movement, as described, on said main shaft, means for rotating said sleeve, the sliding clutch 9, having a key-connection with said sleeve and capable of engagement with one end of said clutch 25, and the shipper-rod 34, having an arm, 394, engaging with said sliding clutch, combined and operating substantially as set forth.

41. The carriage, the ropes 499, the shaft 30, having the winding-scrolls 190 and 205 thereon, which are connected by ropes, as described, with the carriage-counterbalancing weight, said shaft 30 having a worm-and-gear connection, as described, with the gear 35, and means, as described, for supporting and operating said gear, combined and operating substantially as set forth.

HERBERT T. BARDWELL.

Witnesses:
G. M. CHAMBERLAIN,
WM. H. CHAPIN.